(12) United States Patent
Watt et al.

(10) Patent No.: US 10,129,818 B2
(45) Date of Patent: Nov. 13, 2018

(54) AUTOMATED ACCESS POINT PROVISIONING

(71) Applicant: ARRIS Enterprises LLC, Suwanee, GA (US)

(72) Inventors: Alf Orion Watt, San Francisco, CA (US); William S. Kish, Sunnyvale, CA (US); Amit Jawahar Rele, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 176 days.

(21) Appl. No.: 15/153,522

(22) Filed: May 12, 2016

(65) Prior Publication Data

US 2016/0337945 A1    Nov. 17, 2016

Related U.S. Application Data

(63) Continuation of application No. PCT/US2014/065188, filed on Nov. 12, 2014.
(Continued)

(51) Int. Cl.
| | |
|---|---|
| H04L 29/06 | (2006.01) |
| H04W 48/14 | (2009.01) |
| H04W 76/10 | (2018.01) |
| H04W 4/50 | (2018.01) |
| H04W 48/16 | (2009.01) |
| H04W 48/20 | (2009.01) |

(Continued)

(52) U.S. Cl.
CPC ............. *H04W 48/14* (2013.01); *G06K 9/18* (2013.01); *H04L 63/08* (2013.01); *H04L 63/10* (2013.01); *H04W 4/50* (2018.02); *H04W 12/06* (2013.01); *H04W 12/08* (2013.01); *H04W 48/16* (2013.01); *H04W 48/20* (2013.01); *H04W 76/10* (2018.02); *H04W 88/08* (2013.01); *H04W 88/18* (2013.01)

(58) Field of Classification Search
CPC ................................. H04L 63/08; H04L 63/10
See application file for complete search history.

(56) References Cited

U.S. PATENT DOCUMENTS

| | | | |
|---|---|---|---|
| 2009/0055898 A1* | 2/2009 | Kaippallimalil | H04L 63/162 726/3 |
| 2009/0156213 A1 | 6/2009 | Spinelli et al. | |

(Continued)

OTHER PUBLICATIONS

PCT International Search Report of PCT/US14/65188 dated Feb. 20, 2015; (2 pgs.).

(Continued)

*Primary Examiner* — Morshed Mehedi
(74) *Attorney, Agent, or Firm* — Stewart M. Wiener

(57) ABSTRACT

Methods and systems of provisioning an access point (AP). Certain example embodiments include using a gateway in communication with a network and a data storage and receiving user login information from a mobile device, retrieving user permission information from the data storage based on the user login information, sending authorization to the mobile device based on the permission information, sending a prioritized list of at least one AP to receive service to the mobile device, receiving at least one of a selection of a target AP on the list, and label information of a target AP, and sending information regarding the target AP for display on the mobile device.

20 Claims, 20 Drawing Sheets

Provisioning

Related U.S. Application Data

(60) Provisional application No. 61/903,338, filed on Nov. 12, 2013.

(51) Int. Cl.
*G06K 9/18* (2006.01)
*H04W 12/06* (2009.01)
*H04W 12/08* (2009.01)
*H04W 88/08* (2009.01)
*H04W 88/18* (2009.01)

(56) References Cited

U.S. PATENT DOCUMENTS

2010/0008259 A1* 1/2010 Yoon .................... H04W 48/20
 370/254
2011/0081860 A1* 4/2011 Brown ............... H04N 1/00347
 455/41.3
2013/0080520 A1* 3/2013 Kiukkonen ............ G06Q 50/01
 709/204

OTHER PUBLICATIONS

PCT Written Opinion of the International Searching Authority of PCT/US14/65188 dated Feb. 20, 2015; (4 pgs.).
PCT International Preliminary Report on Patentability of PCT/US14/65188 dated May 17, 2016; (1 pg.).

* cited by examiner

Provisioning

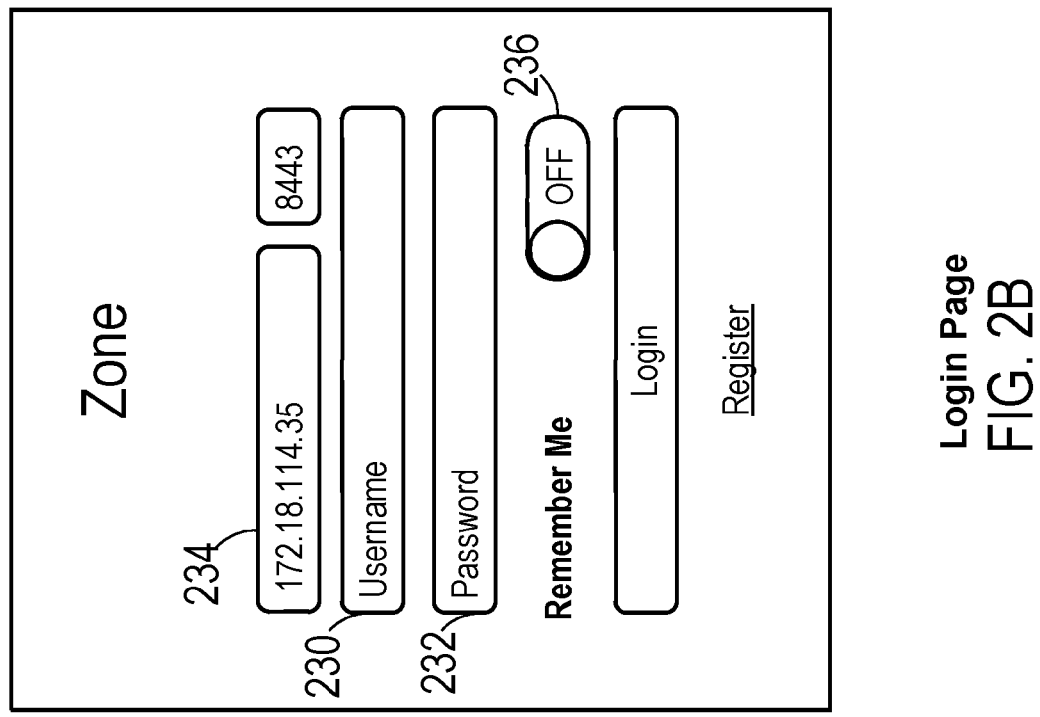

AP Inventory Page

WLAN Page

Configure Device

Client List

Client Detail

Scan AP

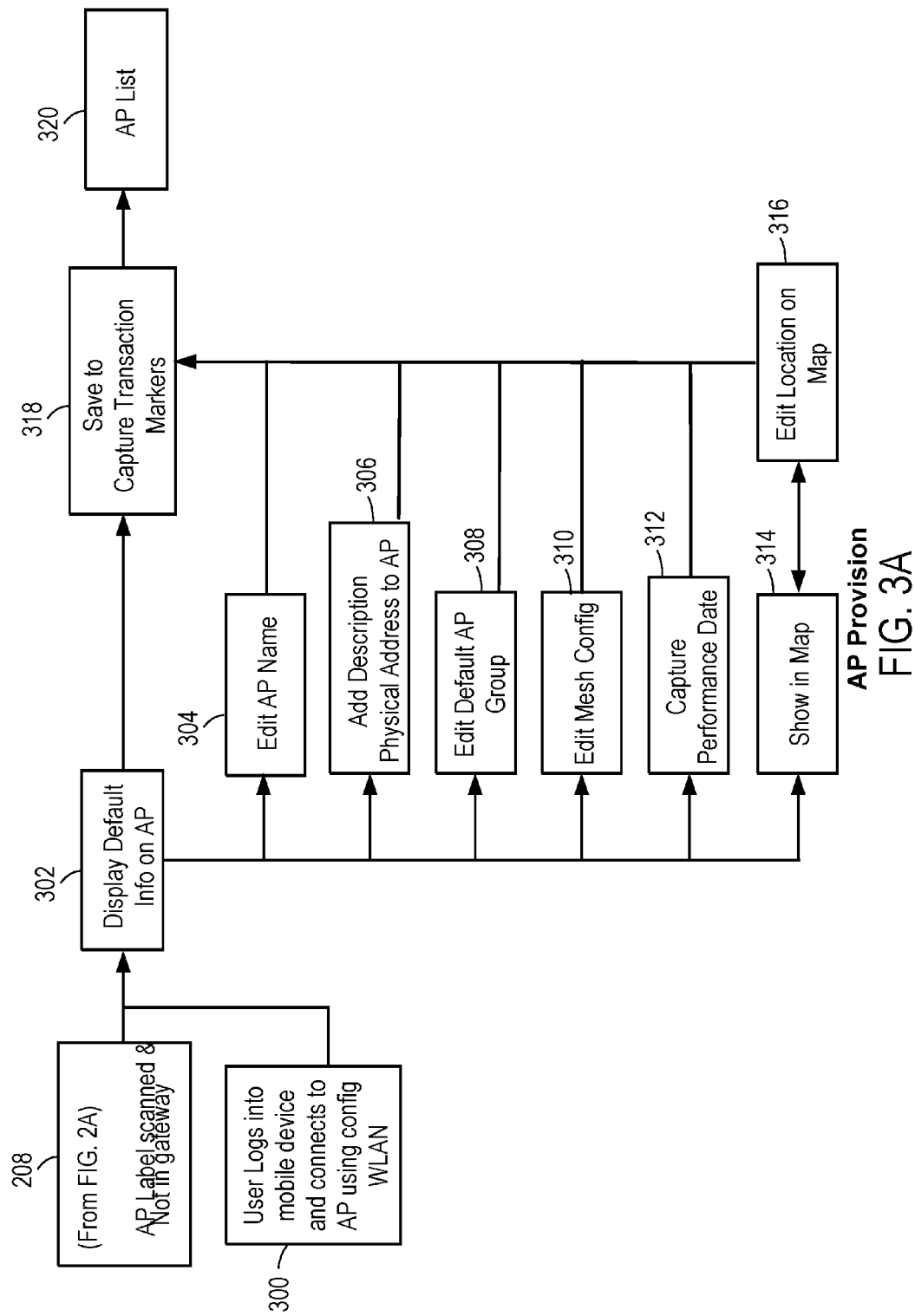

AP Provisioning

AP Provisioning

AP Provision

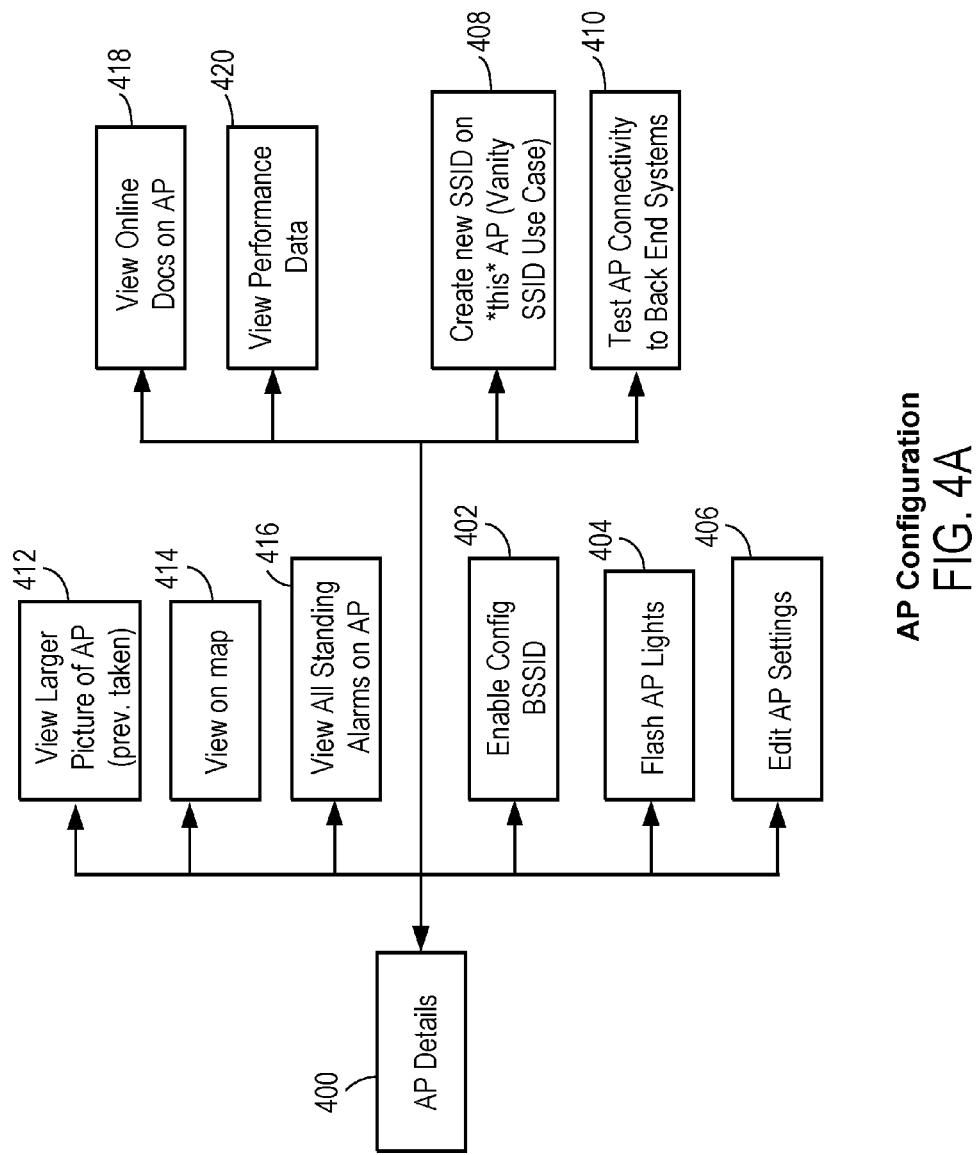
FIG. 4A AP Configuration

AP Configuration

AP Detailed Information

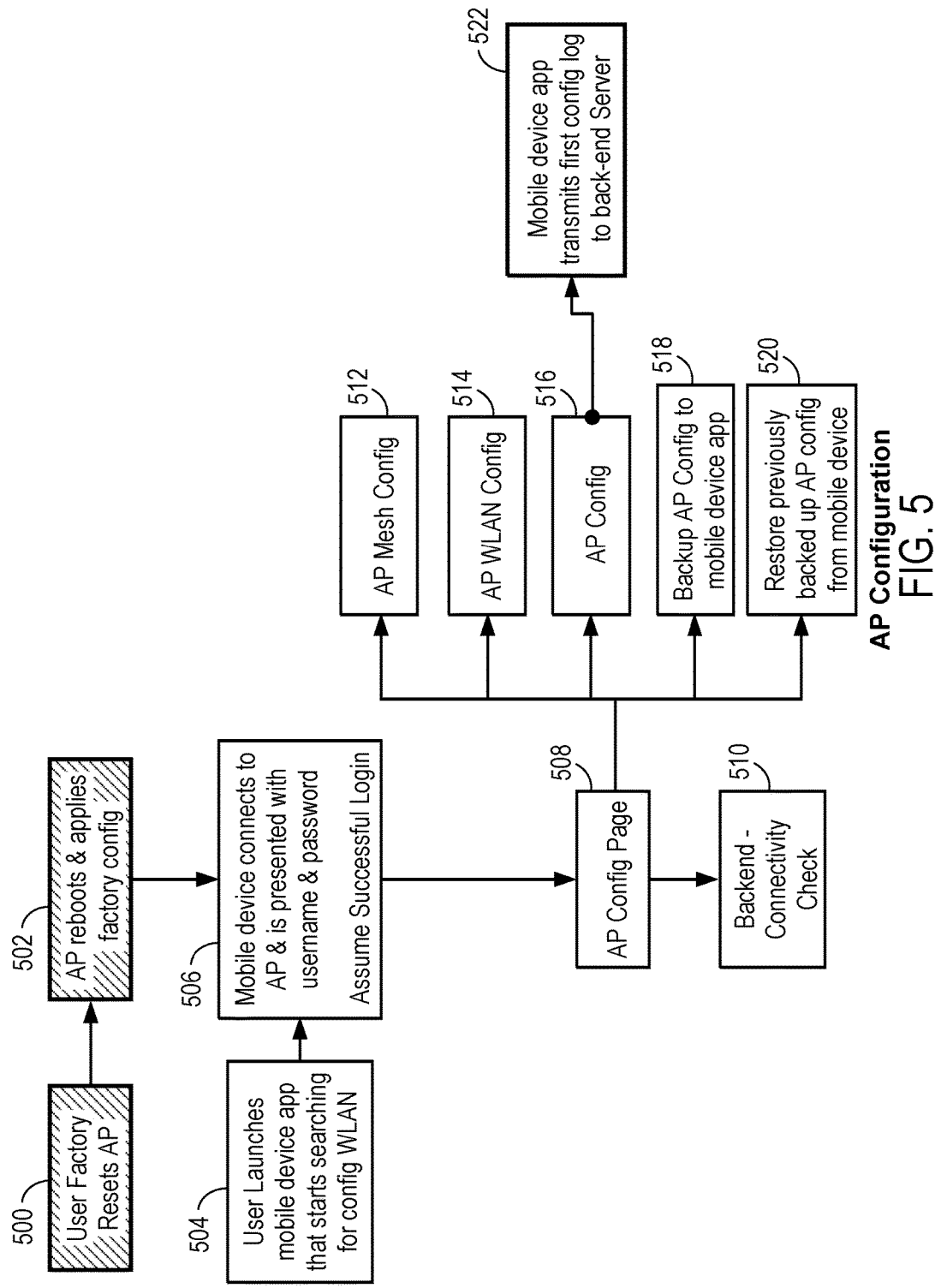

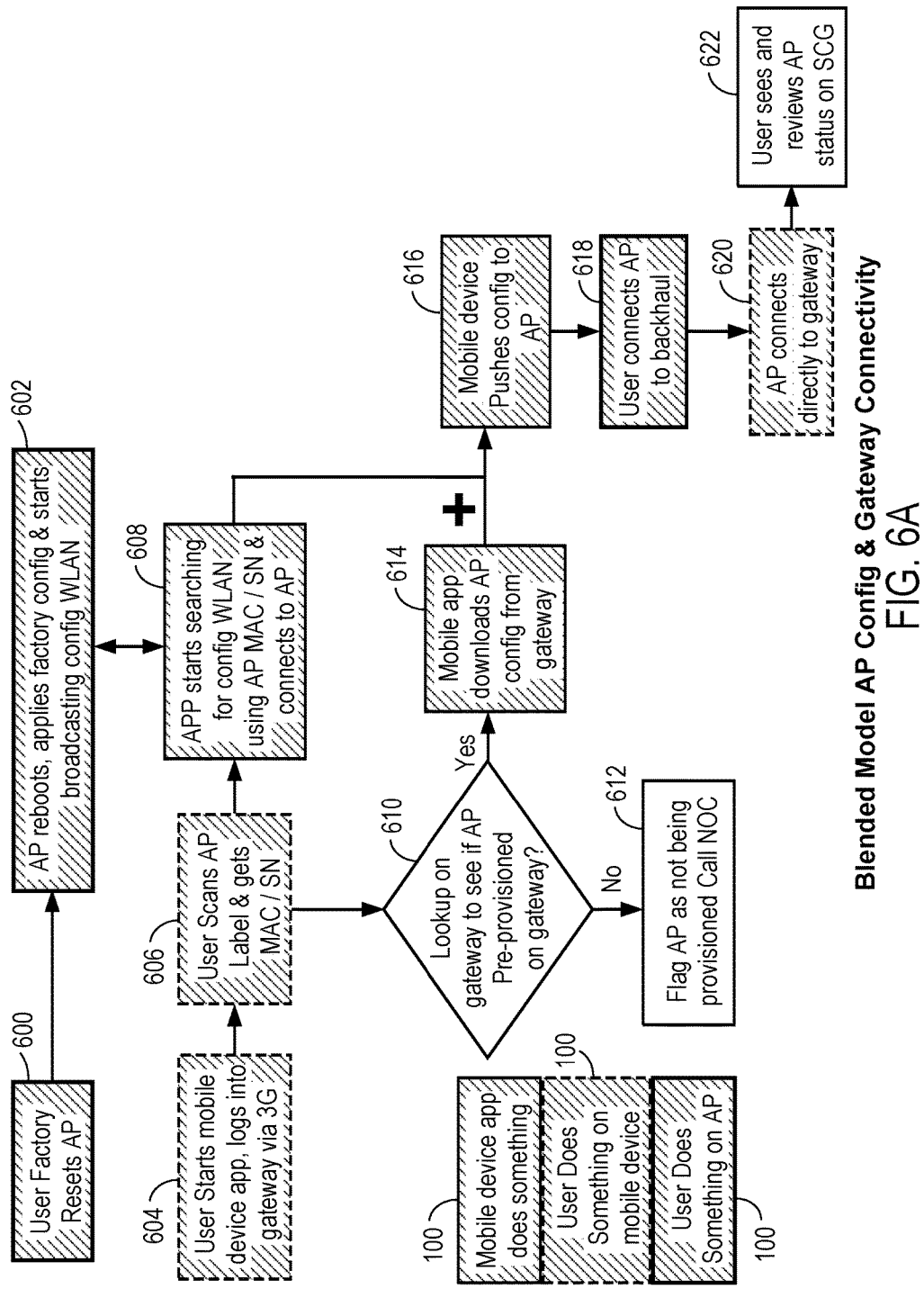

Parallel Workflow (Gateway & AP)

Maps

AUTOMATED ACCESS POINT PROVISIONING

CROSS REFERENCE TO RELATED APPLICATIONS

This application claims priority from and is a continuation of international PCT patent application PCT/US14/65188 filed 12 Nov. 2014, which claims priority to U.S. Provisional patent application U.S. 61/903,338 filed 12 Nov. 2013, which is incorporated herein by reference in its entirety.

TECHNICAL FIELD

This application relates to the field of wireless networks, and more particularly to facilitating access point operation.

BACKGROUND

Conventional installation and provisioning of access points in a communication network may be inefficient and prone to error. Typically, physical installation of an Access Point (AP) for a Service Provider (SP) is performed by a field technician at a desired location. In order to turn up a newly-installed AP (provision), the field technician must call a Network Operation Center (NOC) and manually relay information to provision and/or configure the AP. Conventionally, the field technician must deploy the AP without network connectivity. If a problem with the installation or other issue with the AP is later determined, subsequent visits to the AP are required.

SUMMARY

Disclosed here are exemplary systems and methods of provisioning an access point (AP). Certain example embodiments include, via a gateway in communication with a network and a data storage, receiving user login information from a mobile device, retrieving user permission information from the data storage based on the user login information, sending authorization to the mobile device based on the permission information, sending a prioritized list of at least one AP to receive service to the mobile device, receiving at least one of, a selection of a target AP on the list, and label information of a target AP, and sending information regarding the target AP for display on the mobile device.

Certain example system and method embodiments further comprise via the gateway in communication with the network and the data storage, receiving a picture of a bar code on the target AP, correlating the received picture of a bar code to a MAC address of the target AP storing the MAC address information of the target AP in data storage.

Some embodiments further comprise via the gateway in communication with the network and the data storage, sending location information of the target AP to the mobile device. And in some embodiments, the location information includes a map. In some examples, the service is configuring.

Some examples further comprise via the gateway in communication with the network and the data storage, comparing the received target AP label information against a list of APs registered in the gateway, if the received target AP label information is not found in the list, sending default information on the target AP to the mobile device for display.

In certain examples embodiments, the default information includes at least one of, AP name, physical address, default group, mesh configuration, capture performance date and map location. In some examples, the default information is editable by the user via the mobile device.

Some example systems and methods may further comprise via the gateway in communication with the network and the data storage, receiving edits to the default information from the user via the mobile device, and saving the edits to the default information on the data storage. And some examples may further comprise via the gateway in communication with the network and the data storage, receiving test information from the mobile device, and causing storage of the received test information in the data storage.

Some examples may include, via the gateway in communication with the network and the data storage, receiving client statistics, and storing the client statistics on the data storage. And in some examples, the label information is a picture of a bar code.

Certain example embodiment systems and methods may further include, via the gateway in communication with the network and the data storage, at least one of, enabling configuration of BSSID, enabling editing of AP settings, and allowing creation of a new SSID. Also, embodiments may include via the gateway in communication with the network and the data storage, at least one of, flashing AP lights, allowing testing to be conducted on the target AP backend connectivity, and sending performance data to the mobile device.

Some examples may have, via the gateway in communication with the network and the data storage, at least one of, sending a picture of the target AP to the mobile device, sending a map location of the target AP to the mobile device, sending an alarm status of the target AP to the mobile device, and sending AP documents to the mobile device. In some examples embodiments, via the gateway in communication with the network and the data storage, receiving testing data from the backend connectivity testing.

Certain example embodiments may include non-transitory computer-readable medium encoded with a computer program, on a mobile device with internal memory, for a method of provisioning an access point (AP), the method including communicating with a gateway via a gateway/controller, communicating wirelessly with a target AP for provisioning, receiving provisioning information from the gateway regarding the target AP provisioning, and sending the provisioning information to the target AP, wirelessly. In some example embodiments, the communicating with a gateway is via a cellular connection. And in certain example embodiments, the communicating with the backend server is via another AP. Some examples may further comprise communicating with a backend server via the gateway.

Certain example embodiments may include a non-transitory computer-readable medium encoded with a computer program, on a mobile device with internal memory, for a method of provisioning an access point (AP), the method including receiving provisioning information from a gateway regarding a target AP, loading the received provisioning information into the mobile device internal memory, connecting to the target AP, wherein the target AP is using a security setting, causing display of default information regarding the target AP, allowing the user of the mobile device to edit the default information regarding the target AP, and sending the edited information regarding the target AP to the gateway. In some embodiments, the security setting is an encryption the AP may include a hidden SSID.

In some examples, the security setting is at least one of, a predetermined AP broadcasting time, an AP broadcasting time to wait until the provisioning mobile device is logged off the first time, the AP limited access by accepting traffic only to the AP with no access to an uplink port, an encryption key that is only available with the provisioning application on the mobile device.

In some examples, the user input to the default information regarding the target AP is an AP group, or is a mesh configuration or a location on a map.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2B is a illustrative display of the mobile device describing one example method to implement certain embodiments described here.

FIG. 3A is a flowchart describing one example method to implement certain embodiments described here.

FIG. 4A is a flowchart describing example methods to implement certain embodiments described here.

FIG. 5 is a flowchart describing one example method to implement certain embodiments described here.

FIG. 6A is a flowchart describing example methods to implement certain embodiments described here.

DETAILED DESCRIPTION

Figure 1:
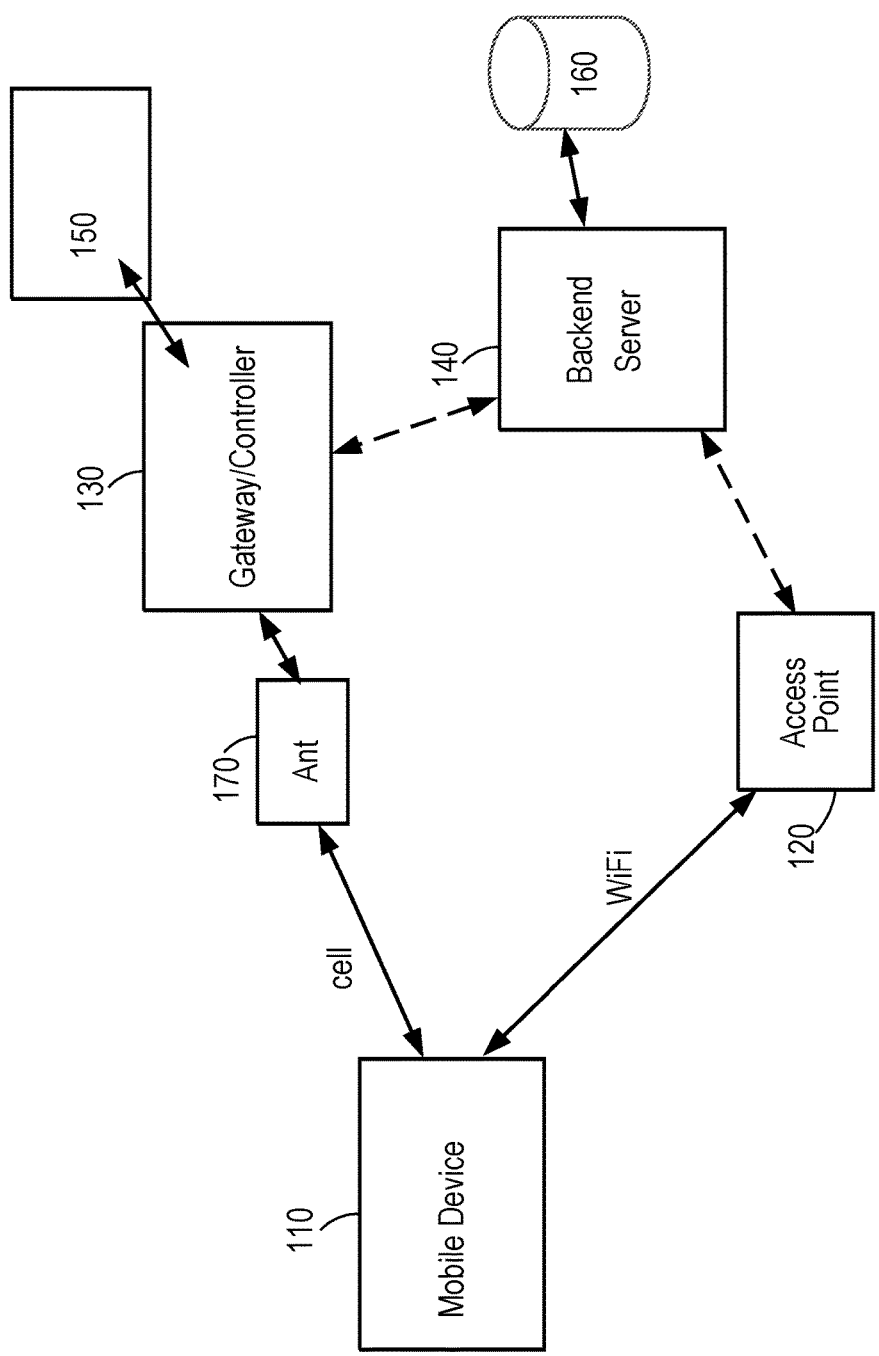
FIG. 1 is a network diagram describing one example system to implement certain embodiments described here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

The present embodiments described herein relate to installing, setting up, troubleshooting, and configuring wireless antenna system sometimes referred to as an access point (AP) in a wireless network. In certain embodiments, such wireless network may comport with 802.11 standards and may be referred to as a Wi-Fi network. But the use of such terms as WiFi are not intended to be limiting, merely illustrative as any of various wireless systems and standards may benefit from the teachings here. Such APs may allow for communication between a wireless user device and a network, such as the Internet as described herein. In certain cases, these APs are owned and operated by a Service Provider (SP) such as such as a cellular service provider phone company like AT&T, Sprint, Verizon or other examples.

Using the inventive aspects disclosed here, a user could install and provision a new AP at the physical installation location (sometimes referred to as turning up an AP), configure an existing and running AP if it breaks down or has trouble, run various tests on an AP, gather information about the physical AP installation site for record keeping, or any number of other things, in certain embodiments, in a secure manner with encryption. Such things may be accomplished without iterative visits to the physical AP installation site.

Thus, in certain embodiments, when an AP is set to be installed or serviced, it may not be connected to the network and therefore may not be in communication with back end systems such as a gateway/controller. It may be that these back end systems can be used to send and receive information to the AP in order to accomplish the various tasks discussed here. In order to allow communication between these back end gateway/controllers and the new or disabled AP, a user's mobile device may be used to provide a communication bridge. In certain embodiments, a backend server may also communicate with the AP, through the gateway and a cellular connection on the mobile device, or through the AP or other APs if in service.

Some more examples are as follows: an AP that is powered on but does not have connectivity or the proper connectivity configuration with a gateway may be provisioned by the mobile device with settings such as the gateway IP, DNS Address, DHCP Server address, etc. In another example, an AP is installed on a telephone pole that a user desires to connect to another AP or mesh—the mobile device may facilitate the connection and configuration of the AP to other devices without requiring the user to pull the AP down, or to climb the telephone pole with a laptop, as is traditionally performed.

It should be noted here that the term gateway/controller is not intended to be limiting. Any of various systems may be used to communicate with, provision, send and receive information to and from an AP. The use of the term gateway/controller in this document may refer to any of such systems.

Example Networks

FIG. 1 is an example network diagram according to certain implementations. An example mobile device 110 is provided to facilitate the process of communicating with the newly installed AP 120 as described here. By communicating with it, the mobile device 110 may be used to turn up, or provision a newly installed AP 120, troubleshoot and/or configure an already installed AP. In certain embodiments, the mobile device 110 is capable of multiple wireless connections. Such multiple wireless connections could include, for example, WiFi connectivity to the AP 120 which is the target of the service and also another connection, such as cellular data connectivity through some kind of cell tower connection 170. Through such example secondary connection, the mobile device 110 may be able to communicate with a back end system such as a gateway/controller 130 and ultimately, via either connection channel, to a backend server 140. In some embodiments, the mobile device 110 may manage these concurrent connections such that a user does not need to manually change from WiFi to cellular between the mobile device and the gateway connection and between the mobile device 110 and the AP 120 connection. The mobile device 110 in this example is capable of simultaneously connecting to both the gateway via cellular and to the AP 120 via WiFi.

In certain example embodiments, the mobile device 110 may communicate to the backend server 140 via another AP (not pictured) which is functioning properly, already provisioned and allow communication to the backend server 140.

Still referring to FIG. 1, the mobile device 110, access point 120, gateway 130, and backend server 140 each includes any hardware necessary to perform the functions associated with it, for example a computer processor, memory, antenna for wireless communication, and the like. In this disclosure, the term mobile device may include, but is not limited to, any device configured to communicate wirelessly, for example smartphones, laptops, netbooks, ultrabooks, tablets, phablets, handheld computers, wearable computers including watches, bracelets, glasses, etc. In certain embodiments, the mobile device 110 includes a display and may run on any operating system, including mobile operating systems, and may optionally include a camera and location determining component, for example, a GPS system.

Once properly installed, the AP 120 may provide wireless network access to multiple mobile wireless devices. In certain implementations, the AP 120 may be provisioned and managed by a Service Provider (SP). In certain embodiments, the gateway is a wireless access gateway/controller to a SP mobile core packet core 150 and connects the AP 120 and mobile device 110 to the mobile packet core 150. An SP may provide and control the gateway 130 to integrate WiFi traffic to the SP mobile core 150. The system may include a plurality of gateways, servers and access points, however in FIG. 1 for example, a single gateway, access point, etc. are described for ease of explanation only but are not intended to be limiting. In the example, the backend server 140 may connect to one or both of the mobile device 110 and gateway 130 to provide translation services, documentation and data storage, 160.

In certain embodiments, the mobile device 110 may first download information such as predetermined/bootstrap AP configuration information from the gateway 130 via whichever communication it has established with the gateway 130. Then, it may push the predetermined/bootstrap configuration information to the AP 120 with or without being in simultaneous communication with both the gateway 130 and the AP.

After the AP is installed and first provisioned, the mobile device may also perform post-installation verification and may record information related to the AP for later use, or send the information to the gateway and/or backend server. The mobile device may also be used to determine, record and display information related to the AP for installation or diagnostic purposes, including for example, environmental conditions at the physical AP installation site. The mobile device may also perform any number of tests including connectivity tests on the AP.

In some embodiments, the user can input provisioning and/or configuration information manually and directly to the mobile device which then communicates with the AP without the gateway's instruction.

In certain embodiments, the mobile device 110 may be used to help verify installation of an AP by recording and transmitting pictures of the AP installation site and also optionally tagging a corresponding GPS location to the picture.

In addition, the mobile device could be used to conduct any number of tests on the installed AP such as speed tests, and further records data related to the installation such as a timestamp of when AP provisioning is performed and a mark of completion indicating that a user has completed all AP related tasks. The mobile device may also be used to record radio frequency (RF) conditions near the AP site. Any data related to the tests run on the AP 120 may be stored in the mobile device 110 and uploaded to the gateway 130 for archiving and to provide reference data for troubleshooting and to allow other users to verify the AP installation. This may allow confirmation that an AP installation was correctly performed through post-installation verification so as to reduce the need for subsequent site visits to the AP 120.

The mobile device 110 may also host software which may be used to accomplish various other tasks which may help with provisioning, configuring, or gathering testing data or metrics about the AP. Examples include but are not limited to: finding any APs near it; load standing alarms onto an AP; view broadcast SSIDs of any AP it is in communication with; view clients connected to any AP it is in communication with; view an AP's error logs; view documentation associated with an AP it is in communication with; get current backend connectivity status of an AP; take a picture of the AP's physical location and coordinate that picture with a GPS location; run a test to ping upload and download speeds.

Summary of Gateway Functionality Examples

Depending on the embodiment, the user of the mobile device may be given certain permissions and not others. That is, the individual operating the mobile device may be allowed to do only certain things with the installation, such as provisioning and configuration of the AP. The system may have established authority levels, or permissions, to allow a particular user, and by extension their associated mobile device, to do some things and not others. For example, the gateway may provide authorization for a particular mobile device, and its user, to provision or configure an AP, but not run any tests.

Because, in certain embodiments, information required to provision/configure the AP and installation process executed by the mobile device may be stored on the gateway and transmitted to the mobile device, the gateway has the ability to allow or disallow the particular mobile device that information. This information may include the scope of the functions available to a user of the mobile device to provision or configure the AP. Thus, different mobile device users may be provided different sets of permissions with regard to the scope of functions available to provision/configure an AP. The order of execution and steps performed to provide the appropriate permissions may be customizable per end user, for example an SP requirements, and may provide security so that only authorized users/devices are able to find and provision/configure an AP. The provisioning/configuration processes may be customizable based on a number of different criteria determined by a system administrator such as an SP, for example.

The gateway may further drive user level permissions on the mobile device to read/write settings related to APs/AP Groups/Domains. For example, the gateway user permissions may determine if a certain user can read/write on a particular AP/AP Group basis.

The gateway may also drive user level permissions to determine workflow on the mobile device application on a per-user and per-gateway cluster basis. For example, for a particular user, executing performance data may be set by the gateway as mandatory, optional or not available at all.

The gateway may also determine and transmit information to the mobile device related to any number of APs within the network. Such information may indicate which APs are in need of servicing. An alarm system could be established, that would inform the user in the field, which APs need to be serviced, and in what priority. For example, the gateway may provide the mobile device with the highest severity standing alarm for each AP, for example, if there's more than one alarm, then cascading hierarchy, for example, Critical>Major>Minor. It may optionally be acceptable to ignore alarms of lower severity than Minor. In this way, the user could know to service the APs that are most critical first, or which to services in a key geographic servicing area. The gateway may also support black-listing of a particular device in case the device gets stolen and/or compromised.

The gateway may determine a current status of an AP and download and transmit pre-provisioned AP configuration settings to the mobile device. The gateway may further perform benchmark back-end connection metrics on the AP, and also obtain and transmit the alarm status of the APs.

In certain embodiments, the gateway may be capable of receiving and/or storing pictures of the physical AP obtained from the mobile device, and push pictures of the AP to the mobile device, for instance, in an AP Details page. The gateway may also receive and store performance data captured and uploaded from the mobile device.

Further, in certain embodiments, the gateway is a wireless access gateway/controller to a SP mobile core packet core and connects the AP and mobile device to the mobile packet core. Such a controller embodiment may be configured to get current status of an AP in the network, download pre-provisioned AP configurations, benchmark back-end connection metrics, and even get alarm status of the various APs.

Summary of Backend Server Functionality Examples

In certain embodiments, the backend server is unnecessary. In such cases, the gateway is able to provide information, permissions, documentation, etc. But in some embodiments, the backend server may be used to store the information sent to and received from the AP, through the mobile device. In certain embodiments that storage may be on a data storage (160 in FIG. 1) or cloud data storage. For example, the backend server may store an AP Activation log, AP documentation and mobile device documentation for the mobile device. Information related to AP provisioning/configuration and AP installation verification may be transmitted from the mobile device to the backend server in addition, or in place of, the gateway for storage, analysis and/or troubleshooting. The backend server may be provided by the SP or by another group to provide services for the SP. In some implementations, the backend server may provide a shim layer between the mobile device and gateway so as to provide message translation where the mobile device and gateway operate using different APIs.

In certain implementations, the backend server receives and stores events and status messages related to any of the mobile device features. The received data may be provided as a text message that contains a status. The backend server may also serve as an integration point for various operational support systems/business support systems (OSS/BSS) systems of the SP. The backend server may be installed at a SP site or connected to the SP through the cloud.

More Examples

Figure 2A:
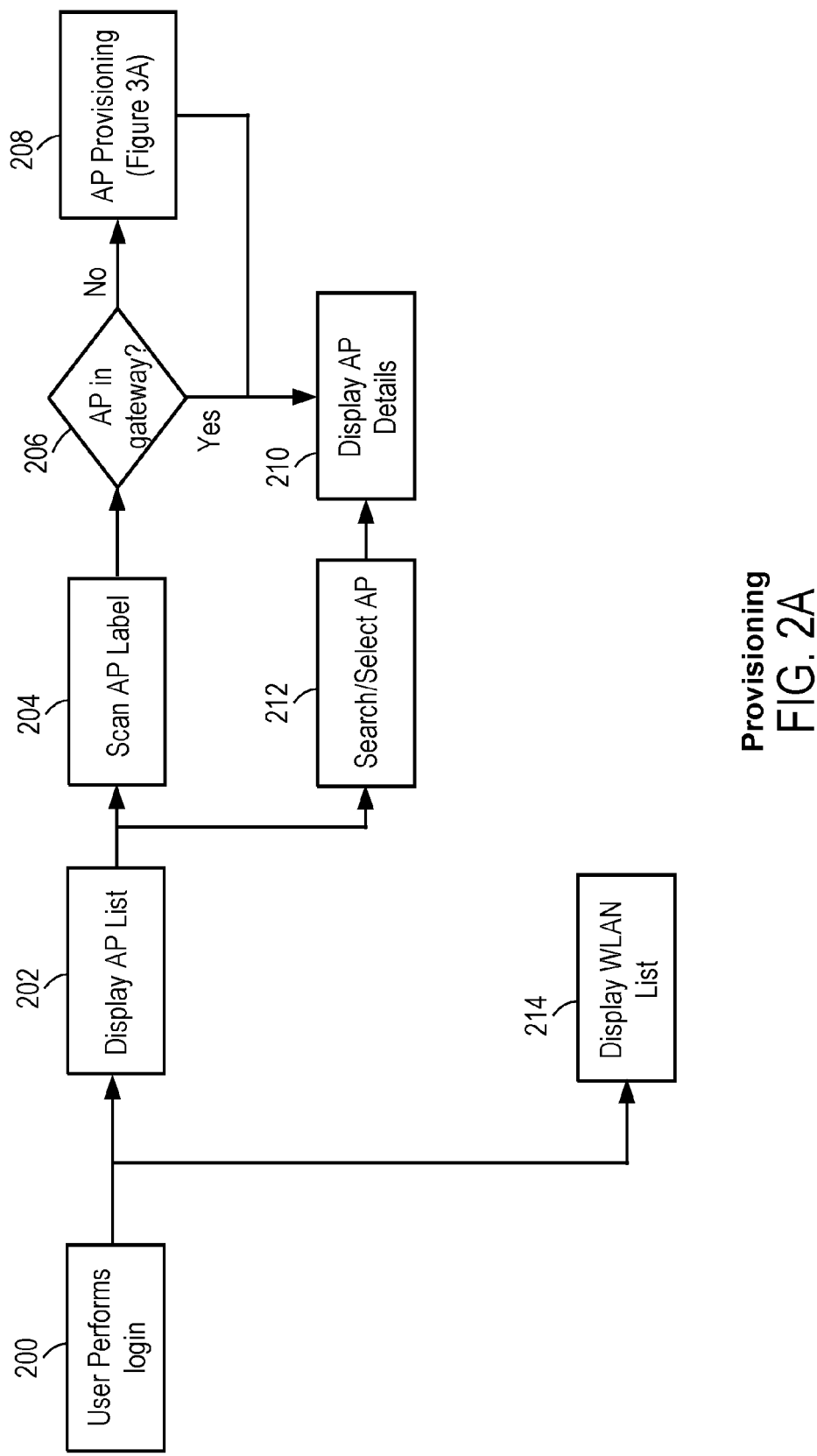
FIG. 2A is a flowchart describing one example method to implement certain embodiments described here.

Referring to FIG. 2A, for a user in the field hoping to provision or configure an specifically targeted AP, the user could utilize a wireless mobile device to first find the target AP. The gateway could also inform the user, via the wireless mobile device, of the priority of which APs to service in examples with multiple APs in a network. Further, priorities may be established as to which order to service the APs.

To do so, the user can sign into the mobile device and the system. Signing into the system may be through any of various wireless connections the mobile device may have established with the backend server and/or gateway/controller as discussed above. For example, if the mobile device has a cellular connection via a cellular tower to a gateway, or via WiFi connection through any of various APs. However the mobile device is able to connect to the gateway and/or backend server, and once authorized and logged in 200, the gateway and/or backend server may send the mobile device information to display one or both of an AP list 202 and a WLAN list 214. These lists 202, 214 may be sorted based, for example, on alphanumeric name, proximity to the location of the mobile device, or based on a geographic area. The location of the mobile device may be determined by an internal GPS unit, or other geo location systems, and sent to the gateway/controller and/or backend server with an accuracy able to allow the user to find the AP in its physical location.

Once the user has found the AP in its physical location, the user may either can the AP's label with any of various devices such as a camera or bar code scanner, or, the user may simply search for the AP and select 212 it from a list provided by the gateway/controller and/or backend server. In the example where the user searches and selects an AP 212 from a list, the gateway/controller may then send the AP details to the user's mobile device for display to the user.

In the example where the user scans the AP label 204, that information is then sent to the gateway/controller in order to determine whether that AP is already registered with the particular gateway 206. If the AP is already registered with the gateway 206 the gateway/controller then sends the AP details to the user's mobile device for display for the user 201. In the example where the AP is not in the gateway 206, the AP may be provisioned 208 and added to the particular network that the user is communicating with. Such example steps for provisioning may be found in FIG. 3A.

FIG. 2B illustrates an exemplary login page/user interface (UI) of a provisioning application displayed on a user's mobile device. The system may allow the user of the mobile device to login and allow the mobile device to communicate to the gateway and/or backend server via a virtual private network (VPN) per specific SP requirements. In some examples, a user may be required to input gateway username 230 and password 232, along with an IP address 234 of the gateway. For example, the user may have to input the fully qualified domain name (FQDN) of the gateway. The input fields may optionally persist where, for example, the gateway IP address is entered just once. In this example, the user is prompted to remember me 236 in order to allow for input fields to persist.

In this example, VPN software is enabled. Also, the system may be configured to remember this gateway (not shown). The system may optionally require FQDN.

In some example implementations, the mobile device transmits the user input login information to the gateway and/or backend server. The gateway and/or backend server determines the level of the user's permissions and authorization levels based on stored user information. In certain embodiments, the gateway returns an authorization to the mobile device, as well as instruction as to which AP to service and/or workflow for a particular AP. The workflow may be the order of steps and/or screens displayed in the mobile device in order to accomplish some task such as provisioning, testing etc. In some embodiments, the mobile device may store the permissions necessary to determine authorization, AP provisioning, AP configuration, functions, and workflow without communicating with the gateway.

Figure 2C:
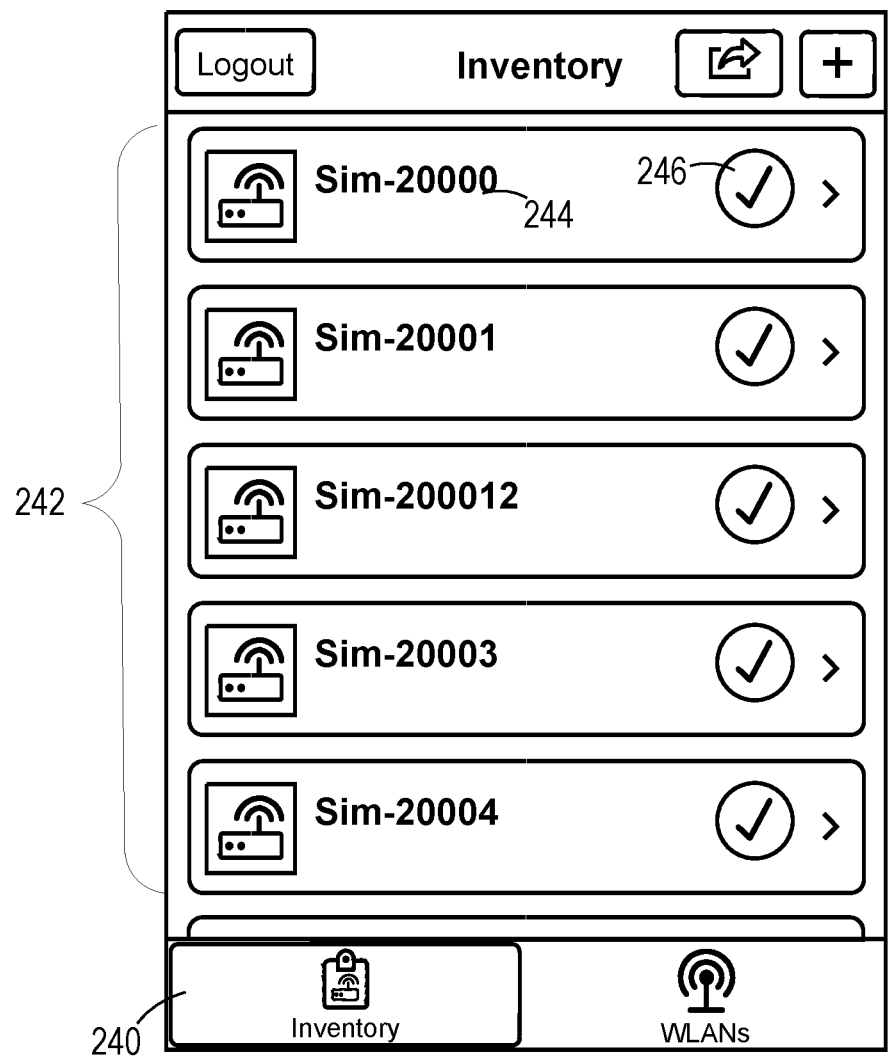
FIG. 2C is a illustrative display of the mobile device describing one example method to implement certain embodiments described here.

A mobile device display of the AP list is illustrated in FIG. 2C discussed below, and may be sorted by status or location, and may also include more detailed information of the AP such as model number, physical distance from mobile device, and so forth. To help determine which AP to service next, information such as an alarm state of an AP may be retrieved from the gateway. Such an alarm state may allow the user to prioritize which AP to service next, depending on how the alarms are set up, or give certain information to the user regarding the AP status. The alarm states may be indicated, for example, by a display of icons, for example, red, yellow and/or green icons.

As mentioned above, an example mobile device display of an AP list is illustrated in FIG. 2C. For example, in FIG. 2C, the mobile device display shows the various AP names in a list of Inventory 240 which is shown as a button at the bottom of the screen. The various APs are listed 242 such as Sim-20000 244, etc. And in the example UI showing the list, each AP has a button 246 showing the status of the AP, and/or any of various alarms, etc. The list of APs may be sorted by status or location, and may also include more detailed information of the AP such as model number, physical distance from mobile device, and so forth.

Next, referring again to FIG. 2A, a WLAN list may be displayed 214. An example display of WLANs, for instance, those identified in a particular AP group is illustrated in FIG. 2D discussed in detail below.

Figure 2D:
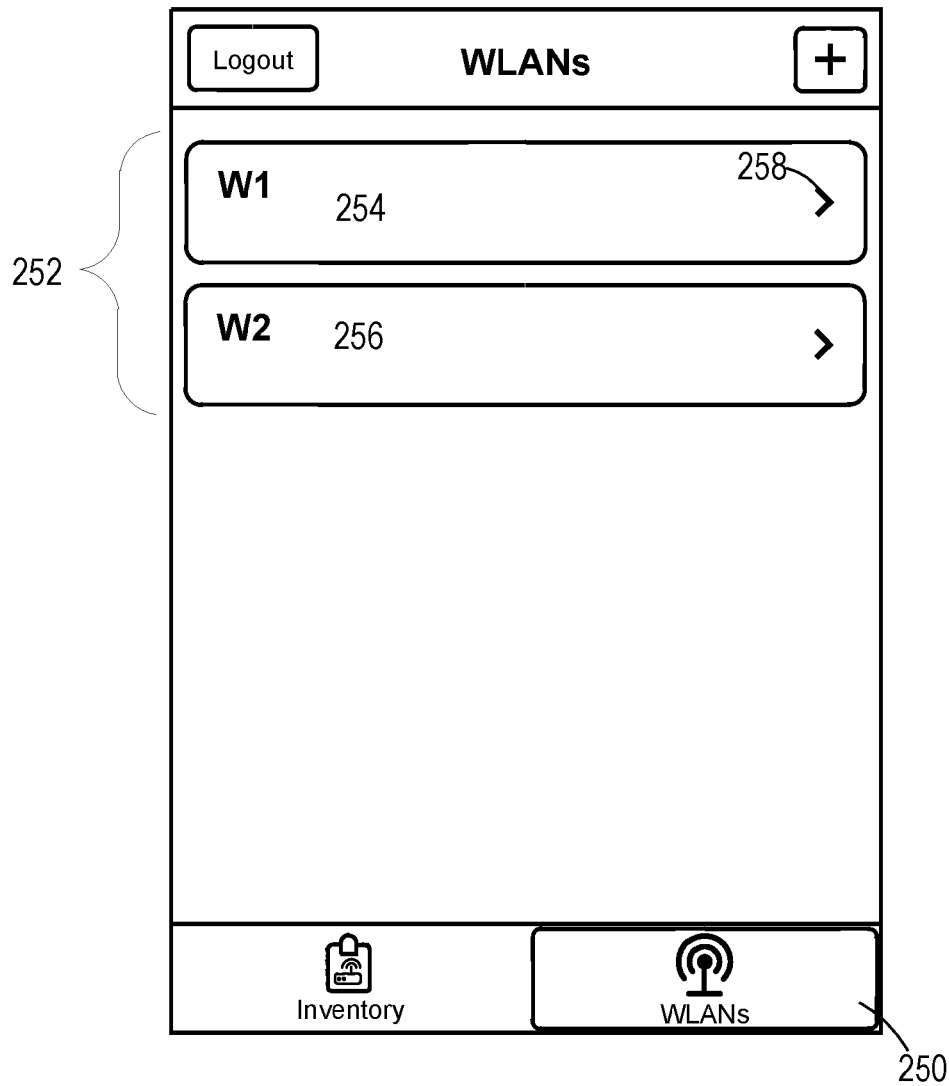
FIG. 2D is a illustrative display of the mobile device describing one example method to implement certain embodiments described here.

FIG. 2D shows an example UI screenshot of a mobile device which is instead of provisioning APs, is used to check the status of WLANS 250 by toggling to the WLANs with the button at the bottom of the UI screen. Such an example was referred to in FIG. 2A 214. Referring again to FIG. 2D, the system may cause display of a list of WLANs 252 on the AP group. The example shows WLAN W1 254 and W2 256. Again, the system may indicate any number of status information on such a screen, and allow the user to press an arrow 258 to receive more detailed information about any of the WLANs shown.

From such an example UI, the user could select any of the displayed WLANs associated with APs in the group, to learn more about how to find that AP and what to do when it is found. An example mobile device UI of a particular selected WLAN is found in FIG. 2E, detailed below.

Figure 2E:
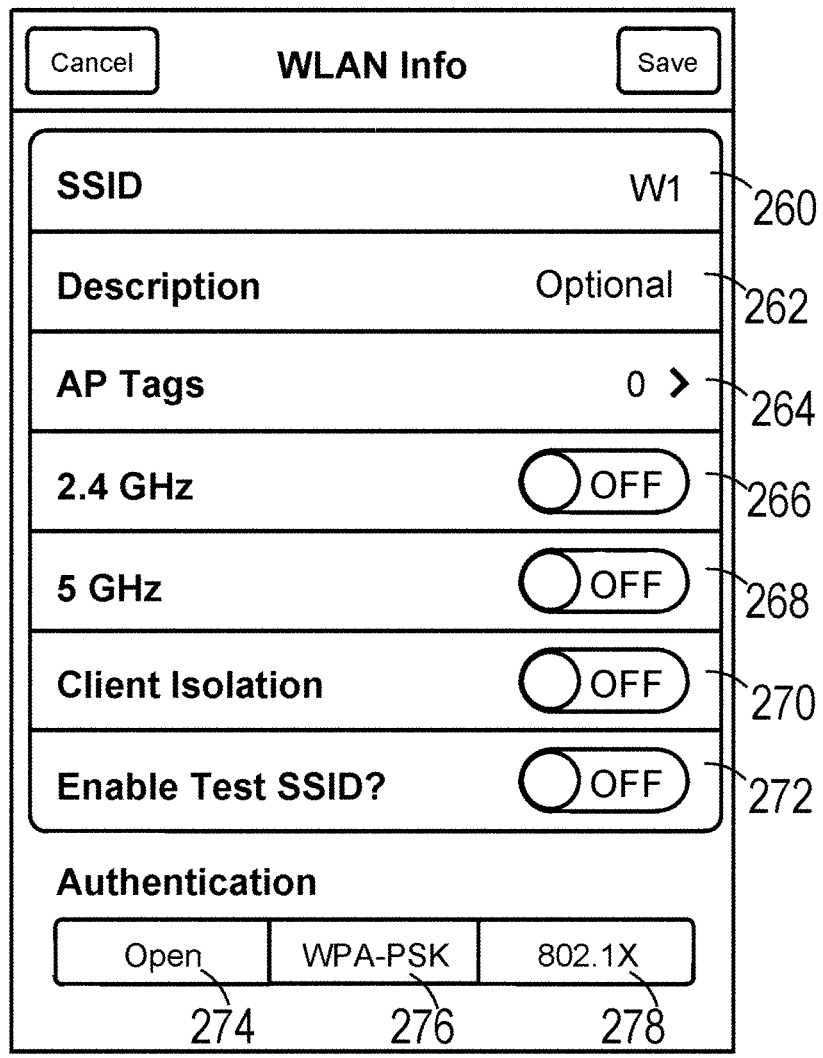
FIG. 2E is a illustrative display of the mobile device describing one example method to implement certain embodiments described here.

As discussed above, an example mobile device UI of a particular selected WLAN is found in FIG. 2E. For example, a user may select a WLAN from an example display. First, the WLAN is selected from a list on the mobile device, which may be sorted in any number of ways, for example by WLAN name, or by geographic location. Next, the UI may allow an edit to the configuration information of the selected WLAN on the corresponding AP. In certain embodiments, the user may also create a new WLAN associated with an AP.

In FIG. 2E, the mobile device UI may be configured to display any of various information about the selected WLAN. Here, the example shows SSID 260 along with a description field 262 shown as optional. Also, AP tags 264 may be used along with selection of 2.4 GHz 266, 5 GHz 268 and client isolation 270, all selected to OFF in the example. IN certain embodiments, the display of AP tags is optional and provided for enterprise applications. Further, the user may select to enable Test SSID 272. Further, authentication may be any one of Open, 274, WPA-PSK 276, or 802.1X 278.

Figure 2F:
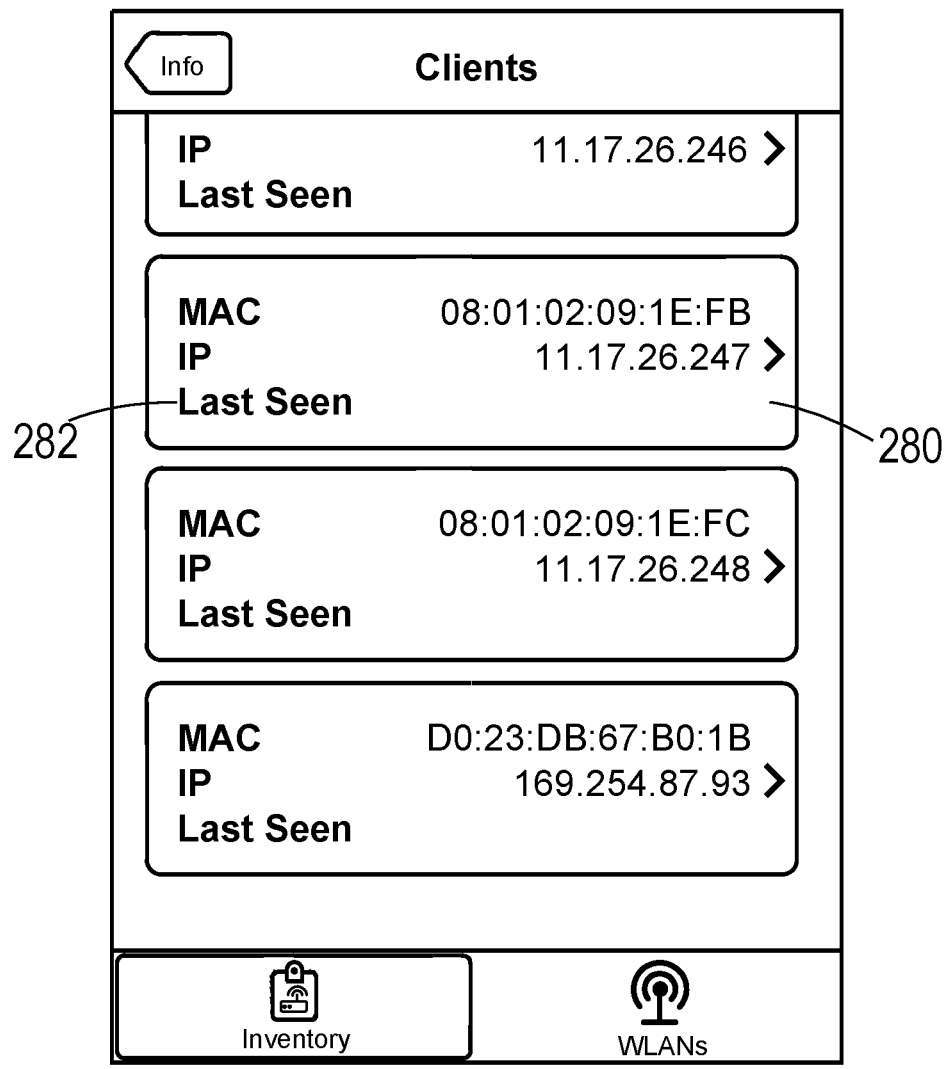
FIG. 2F is a illustrative display of the mobile device describing one example method to implement certain embodiments described here.

Similarly, a user may select a client as shown in FIG. 2F. FIG. 2F shows an example mobile device UI and a list of clients which are each utilizing a particular WLAN. For example one client has its MAC address and IP address listed 280. The screen example here also indicates when the client was last seen 282 which could be a local time of day and/or a count up timer, indicating the time lapse since the client was last in connection with the WLAN. A top level summary of the clients (not shown) may also be provided. Such an example list could include the mobile device MAC address as it may be useful to see how the particular AP sees this client.

Figure 2G:
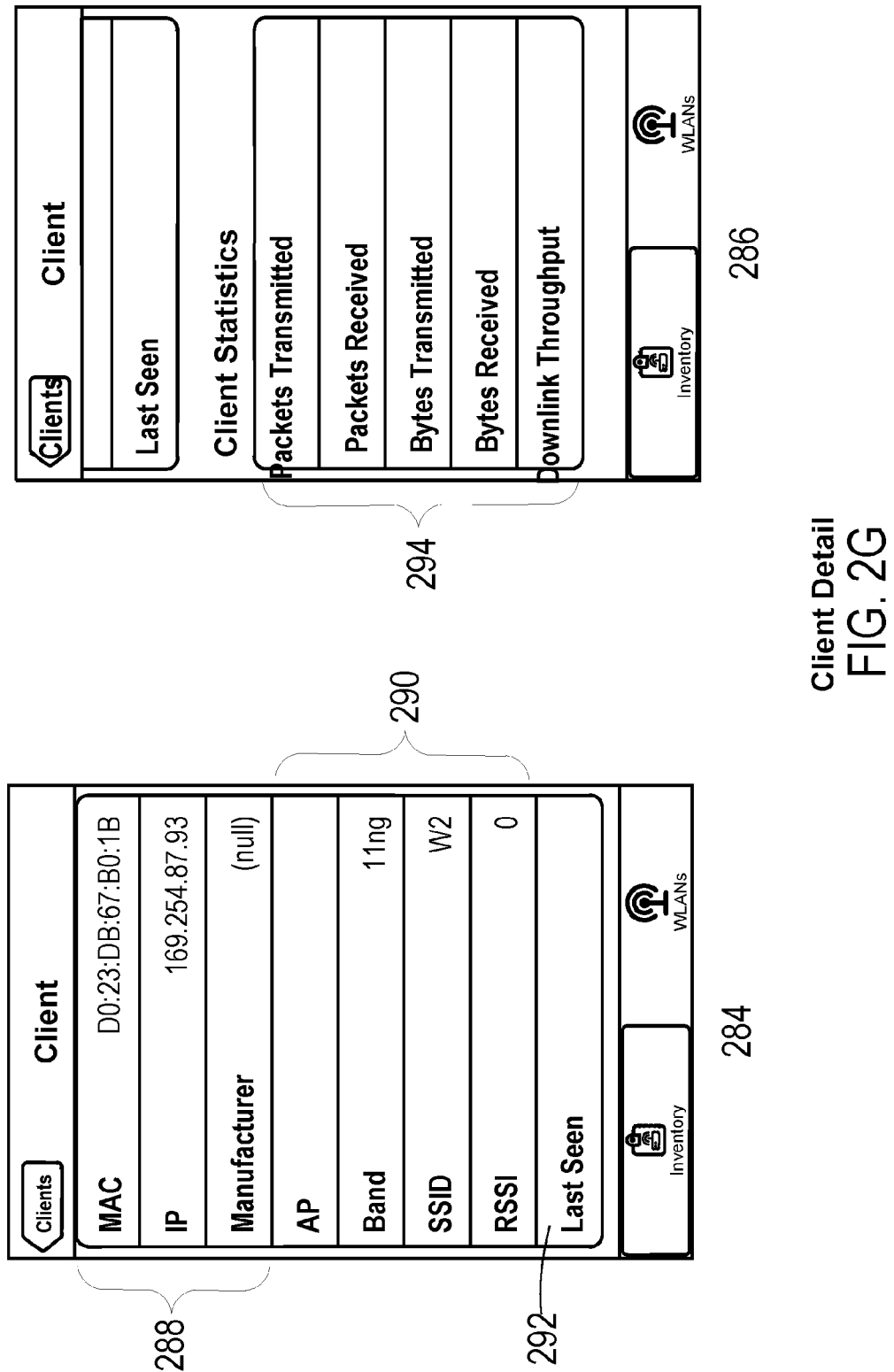
FIG. 2G is a illustrative display of the mobile device describing one example method to implement certain embodiments described here.

Selecting a client could allow for details of the client connections be displayed for the user via the mobile device as shown as an example in FIG. 2G. FIG. 2G shows an example UI with client details. The two example UIs of FIG. 2G 284, 286 show information from one screen if the user scrolls down, regarding the selected client in the example. The first screen 284 as the top of the screen includes details of the MAC address, IP, manufacturer of the client 288 as well as the AP, Band, SSID and RSSI of the connection 290. In certain embodiments, the last seen clock 292 may be shown. The second screen 286 if scrolled down shows example client statistics such as packets transmitted, received and bytes transmitted and received as well as downlink throughput 294. Scrolling may not be necessary on some mobile device embodiment displays, depending on the screen size, type size, and layout of the details on the screen.

The user of the mobile device may provide input to search for a specific AP 212 based on criteria such as serial number (S/N), medium access control (MAC) address, AP name, geographic area, and so forth. The mobile device may use the antenna and wireless processing hardware in it, to scan, search and sort any APs it can communicate with, to find the one it is looking for. It may use the input/selected search criteria to sort them as well. In certain embodiments, instead of selecting an AP from a displayed list of APs in communication with the mobile device, the user may input data related to the AP to identify it. In some embodiments, the user may utilize a camera in the mobile device to visually scan a barcode or other identifier on the AP.

Figure 2H:
FIG. 2H is a illustrative display of the mobile device describing one example method to implement certain embodiments described here.

FIG. 2H illustrates an example scan feature where a camera on the mobile device scans a barcode label of the AP that the user wants to service. FIG. 2H shows example AP scanner embodiments. In the example, the camera of the mobile device may be used to take a picture of the bar code or label on the AP. In such a way, the system may be able to load information about those APs to the system and mobile device. In the example, the UI prompts the user to scan the bar code suing the camera 296. Such a scan can initiate the AP activation process. After scanning the label of an already provisioned AP, the AP information page may be displayed to the user. The user may also scan the back of the box of the AP to get the information about that particular AP.

Such a barcode could be provided on a label attached to the AP, and could be any kind of quick response QR code, or other identifiable code. The scanned visual identifier need not be scanned from the AP or necessarily be a barcode, but may also be scanned from a box, paper or any other visual source somehow associated with the AP.

Once the camera captures the information identifying the AP, the mobile device may determine 206 if the visual identifier matches the AP information stored in the mobile device or retrieved from the gateway. The scanned data may be used to retrieve the AP details from the gateway or from the mobile device itself and the corresponding AP details 210 may be displayed on the mobile device as discussed in detail below. Otherwise, the process flows to step 208 and into FIG. 3A.

Provisioning Examples

In FIG. 3A, the AP needing service is on but it cannot be identified in the gateway, and it does not show up in the gateway even if it has a code label for identification. In such a scenario, an un-provisioned AP may be selected either by the user at the mobile device from a list, or by scanning the physical AP. Either of these may automatically initiate the AP provisioning process, if the system is set up to do so.

When in the field, once the user has identified the AP needed to be worked on, the user could next provision the AP. Provisioning may be just like configuring an AP, but for an AP that has not been in service before, or is being installed or established for the first time.

FIG. 3A illustrates an example AP provisioning process that starts after identifying/finding the AP via scanning, where the AP has not been provisioned FIG. 2A 208 or after the user, through the mobile device, logs in and connects to the AP itself via WLAN 300.

In such an example scenario, default AP information may be displayed 302 and the AP may be provisioned in any number of ways including, automatically, manually by the user, or through a combination of automatic and manual.

In examples where the AP is installed and initially activated it may be vulnerable to outside control. To help ensure that only the authorized users are accessing the AP, the AP could use any number of example security measures. For example, the AP may start broadcasting a limited config WLAN having restrictions based on time, access and encryption. In some examples, the AP may include a hidden SSID, a predetermined broadcasting time, for example, only 15 minutes, or wait until the provisioning mobile device is logged off the first time. The AP may limit access to itself by accepting traffic only to the AP with no access to an uplink port. The AP may use an encryption key that is only available with the provisioning application on the mobile device. Any of these or other security measures may help with security to ensure that only authorized mobile devices gain access and control over an AP.

As disclosed above, the provisioning information for the AP may be downloaded from the gateway by the mobile device or retrieved locally from the local mobile device storage itself. From the default AP information display 302, the user may select to edit any number features, such as the AP name 304, add a description of the physical address of the AP 306, edit a default AP group 308, edit the Mesh Configuration 310 that allows different APs to communicate with each other, and even features to allow the capture of performance data 312. In some embodiments, the AP may be displayed on a map 314, and the user may then edit the location on the map 316. To aid in geo-location, the AP may be configured with geo tag or be loaded with information regarding its AP zone, to broadcast to the user's mobile device.

Permissions to provision the AP may be set per user on the gateway, by the SP or some other entity. In some embodiments, the SP may determine and provide the specific mobile device with a customized workflow based on the associated user's permission level. Such a workflow may determine whether a user of the mobile device provisions the AP automatically or via manual input. For example, if a user such as a technician does not have permission to specify an AP Zone, then this option is not available on that user's mobile device, and is instead set to a default zone. If another user has permission, then the information allowing that user to access AP Zone is pulled from the gateway and a menu for all the AP Zones may be displayed on that other user's mobile device.

Figure 3B:
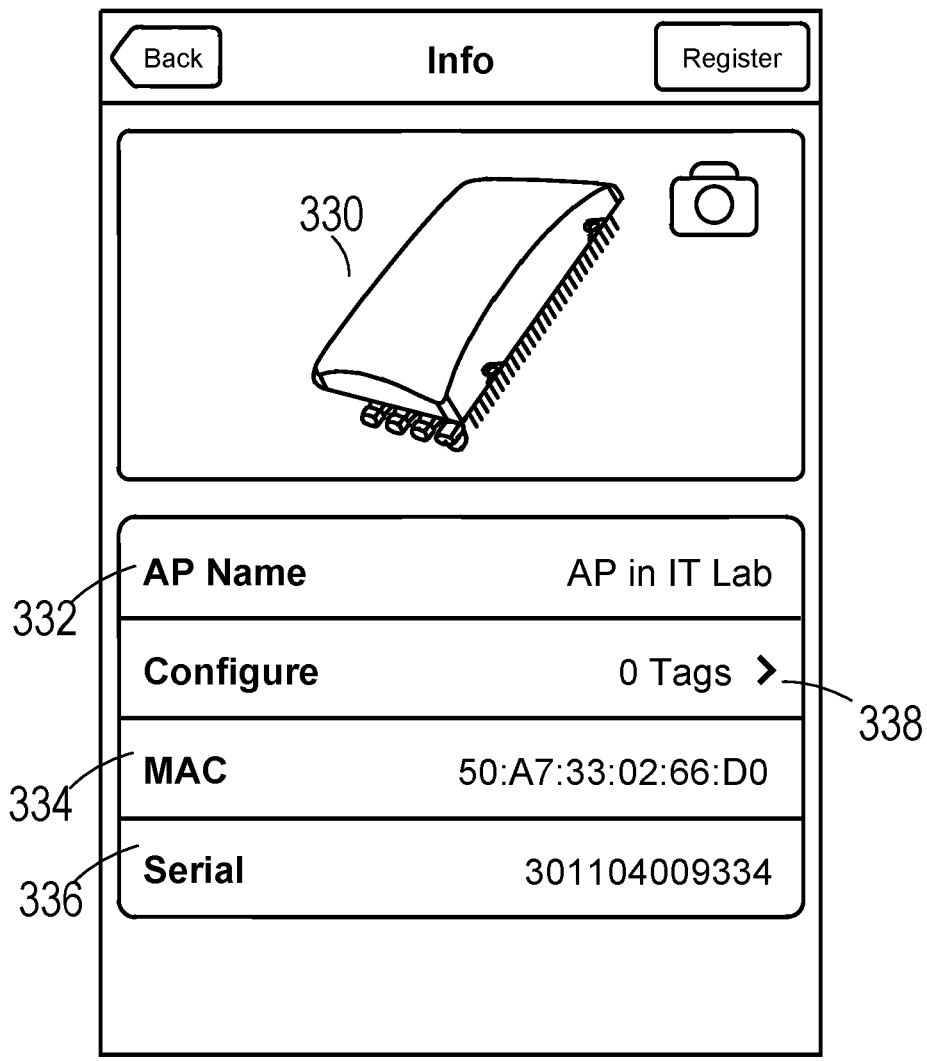
FIG. 3B is a illustrative display of the mobile device describing one example method to implement certain embodiments described here.
Figure 3C:
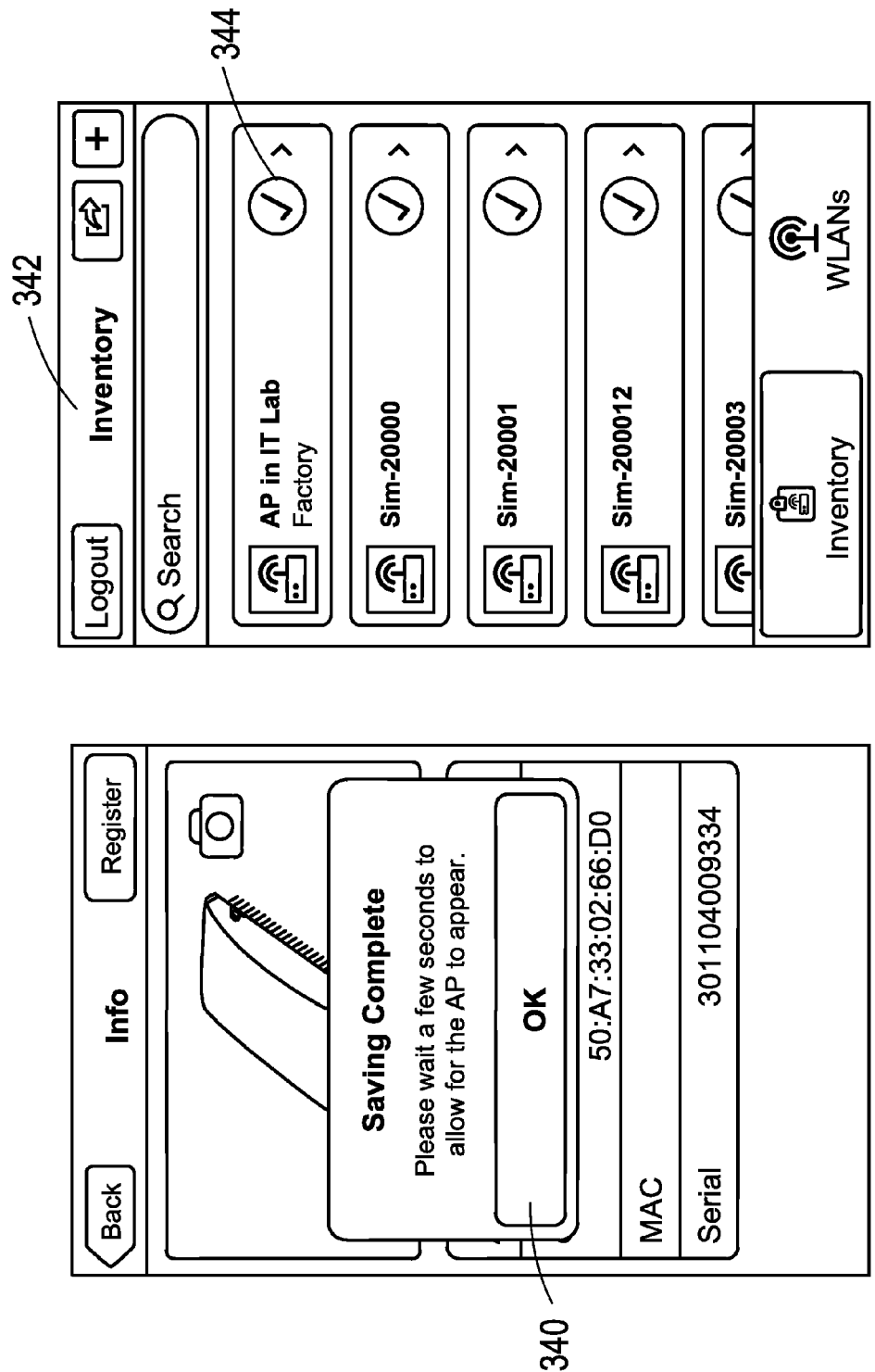
FIG. 3C is a illustrative display of the mobile device describing one example method to implement certain embodiments described here.
Figure 3D:
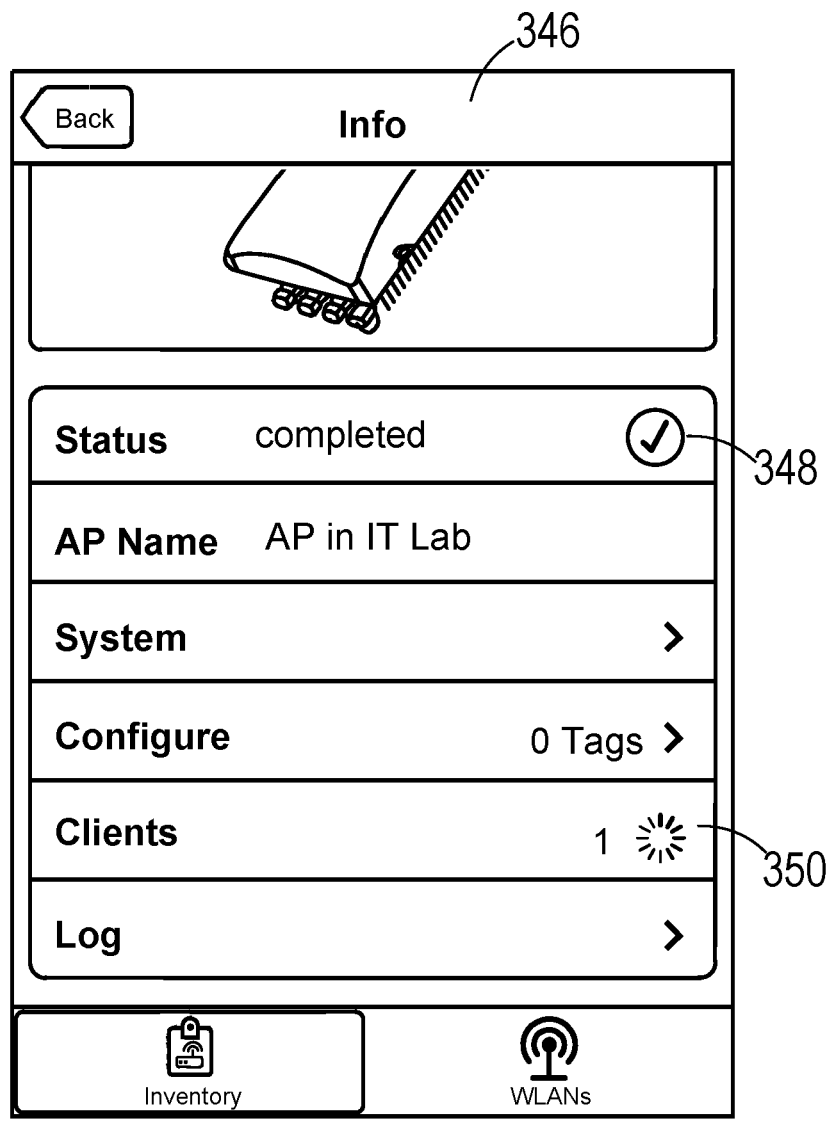
FIG. 3D is a illustrative display of the mobile device describing one example method to implement certain embodiments described here.

FIGS. 3B-3D provide different example UI displays on the mobile device related to the AP provisioning steps of FIG. 3A described in detail below.

Performance Capture Examples

Still referring to FIG. 3A, as part of the provisioning process, performance data 312 may be gathered regarding the AP. A customized checklist may also be provided for the user to view and complete for a provisioning/configuration process that may list mandatory/optional steps available in setting up the AP. Such steps may include any number of performance capture and the resulting data from the tests or requests.

These may include but are not limited to ZAP, spectrum, a picture of the AP, data from a backend/backhaul test and channel selection statistics. Such example channel selection methodologies may include changing channels depending on environmental conditions. The backend connectivity tests, for example, may include connectivity to the gateway, to the Radius, DHCP Servers, DNS servers and also report back the amount of time taken to reach them. The mobile device stores the last time the mobile device attempted to connect to these servers and the results.

This data may be requested and recorded by the mobile device to provide a local benchmark on day zero that allows for future analysis regarding that particular AP. The performance data may also be captured at any time, such as before provisioning, as well as before and after and configuration changes.

Other performance captures may include analytics and mobile device tracking capabilities are further included that enable mobile device application usage tracking including what individual screens are being used/shown on the mobile device. In some implementations, identifiable characteristics (e.g. Device Mac, user name, etc.) are obscured. Aggregated data may be available on a per SP basis.

Once an AP is identified and found, in certain embodiments, after login, the user may also select to view a list of connected clients and associated details of those clients, which a particular AP is in communication with. The example in FIG. 2F shows an example UI and a list of clients on a particular WLAN. A top level summary of the clients (not shown) may also be provided. Such an example list could include the mobile device MAC address as it may be useful to see how the particular AP sees this client.

Transaction Marker Examples

Still referring to FIG. 3A, in certain examples, transaction markers 318 may be used for record keeping and for analysis of the users and APs, in order to memorialize the installation or other service performed. Transaction marker information of other APs may be pushed from the gateway or backend server to the mobile device if an AP is to be reconfigured or for troubleshooting. Transaction markers 318 may be recorded and transmitted to the gateway and/or the backend server and provide information related to the AP installation and provisioning performed. Transaction markers 318 may include features such as Mark Install Complete, User Name of installer, a Time-Stamp of completion, Device GPS location, upstream AP connection information, and the captured performance data 312. AP related activation information may also be sent to the gateway and/or server. This may be executed in a batch process and include information such as AP Serial Number, MAC Address, GPS location, date-time stamp, etc. These messages may be transmitted every time an AP is either factory reset or provisioned via the mobile device, but does not necessarily apply to changes such as configuration changes.

Provisioning Example Details

FIG. 3B shows an example AP provisioning UI. The example shows a photo of the AP allowing the person in the field to more readily identify it. Further, the screen UI shows information such as the AP name 332, MAC address 334 and Serial number 336. Further, the screen may allow the person in the field to configure the AP 338. In the example, there are "0 Tags" shown 338 but the user may click the arrow 338 and be taken to another screen with more details.

It should be noted that the AP could be configured with a geo tag or by an AP zone. Permissions may be set per user on the gateway. If a technician in the field does not have permission to specify an AP zone, then this option will not be available on the mobile device. It may be greyed out or not show up at all. In such a case the default zone may be set. But, if a technician does have permission, then a drop down for all the AP zones may be displayed and populated with information from the gateway.

FIG. 3C illustrates an example completed workflow display UI from the mobile device. In FIG. 3C, upon clicking on OK 340, the system may return to an AP Inventory screen 342. Just as in FIG. 2C, a certain color check mark/icon in this example 344 indicates successful provisioning while a check mark with a different color/icon can indicate an unsuccessful provision. In this way, a technician in the field can quickly ascertain whether the provisioning was successful or not, or whether more trouble shooting needs to be done on a particular AP.

In certain embodiments, upon completion of provisioning, the AP list or the AP information screen 346 display in FIG. 3D is shown. In FIG. 3D, the status is shown as completed 348. Also, one client 350 has successfully associated to the AP, which is indicated on the screen.

More AP Configuration Examples

Figure 4B:
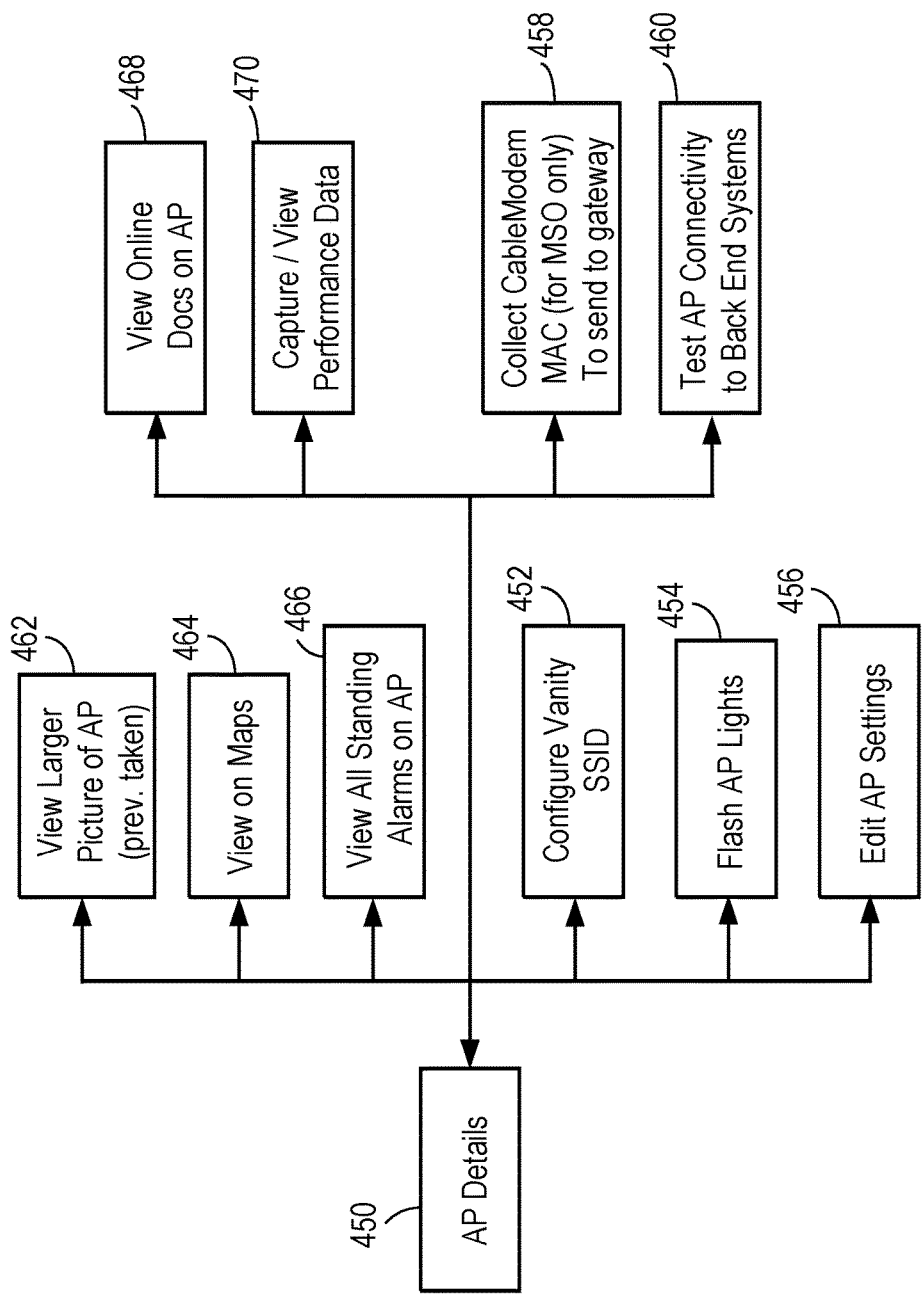
FIG. 4B is another flowchart describing example methods to implement certain embodiments described here.

FIGS. 4A and 4B illustrate example workflow steps which may be taken by the system/user in order to accomplish an AP configuration. Further, such workflow steps may be customized per user. For example, a first user, via the gateway and/or backend server sending information to their respective mobile device, is provided the configuration options in FIG. 4A while a second user is provided the configuration options in FIG. 4B. In the examples, FIG. 4B shows an example Multiple Service Operator (MSO) scenario. The custom workflow may be determined and transmitted to the mobile device at time of login after a gateway and/or backend server authorizes use of an application running on the user's respective mobile device.

Figure 7:
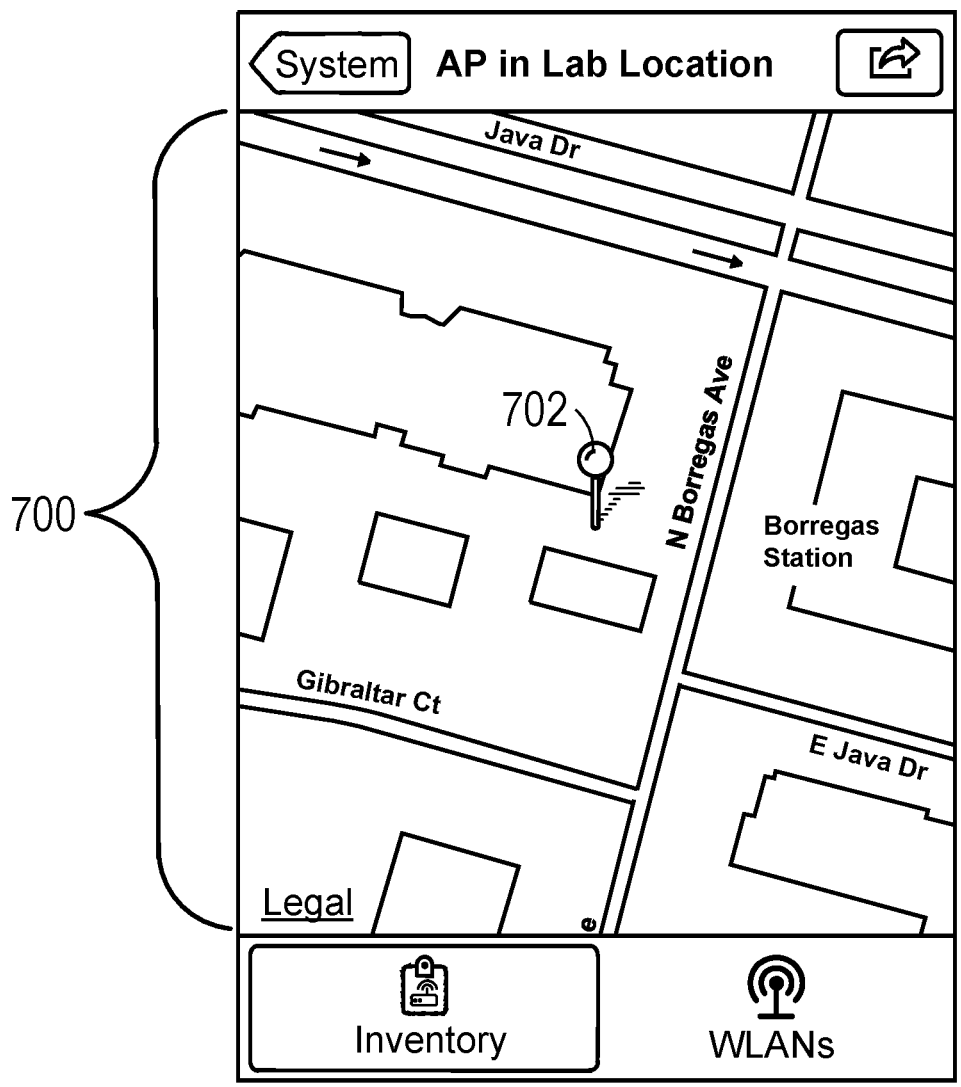
FIG. 7 is a illustrative display of the mobile device describing an example map to implement certain embodiments described here.

As further detailed in FIGS. 4A and 4B, the AP details displayed 400, 450 on the mobile device may include a picture of the AP as well as the highest severity alarm 416, 466 (for example alarms colored Red/Yellow/Green) of the AP or list of APs retrieved from the gateway. Further, an upstream AP in a mesh example, telemetry data and map location of the AP 414, 464 may be displayed. Different sized pictures of the AP 412, 462 may be viewed/selected, separately or at the same time with the location of the AP on a map and the standing alarms of the AP. FIG. 7 illustrates a displayed map of a location of the AP to be serviced, based on information sent from the gateway and/or backend server. Any of the displayed information may be shown in different screens, the same screen or some combination. For the display, the order, layout and level of the details regarding the AP and network information may be customizable by the SP or end user of the system. For example, a low-ranking user may only have permission to view a limited subset of AP information, while a network administrator may have full access to view all data available.

The mobile device may also display documentation related to the AP 418, 468 and an activation log retrieved from a backend server. Retrieved AP documentation may assist an inexperienced user with the AP installation or operation and may reduce the need for the user to seek outside help. For a previously provisioned AP, previously recorded performance details 420, 470 for example, spectrum, the number of sessions, a Session RSSI & SNR, radio bytes, and packets upstream/downstream, may be acquired from either the gateway or backend server and displayed on the mobile device. Performance details 420, 470 of a just provisioned AP may be acquired and/or captured and also displayed on the mobile device.

Figure 4C:
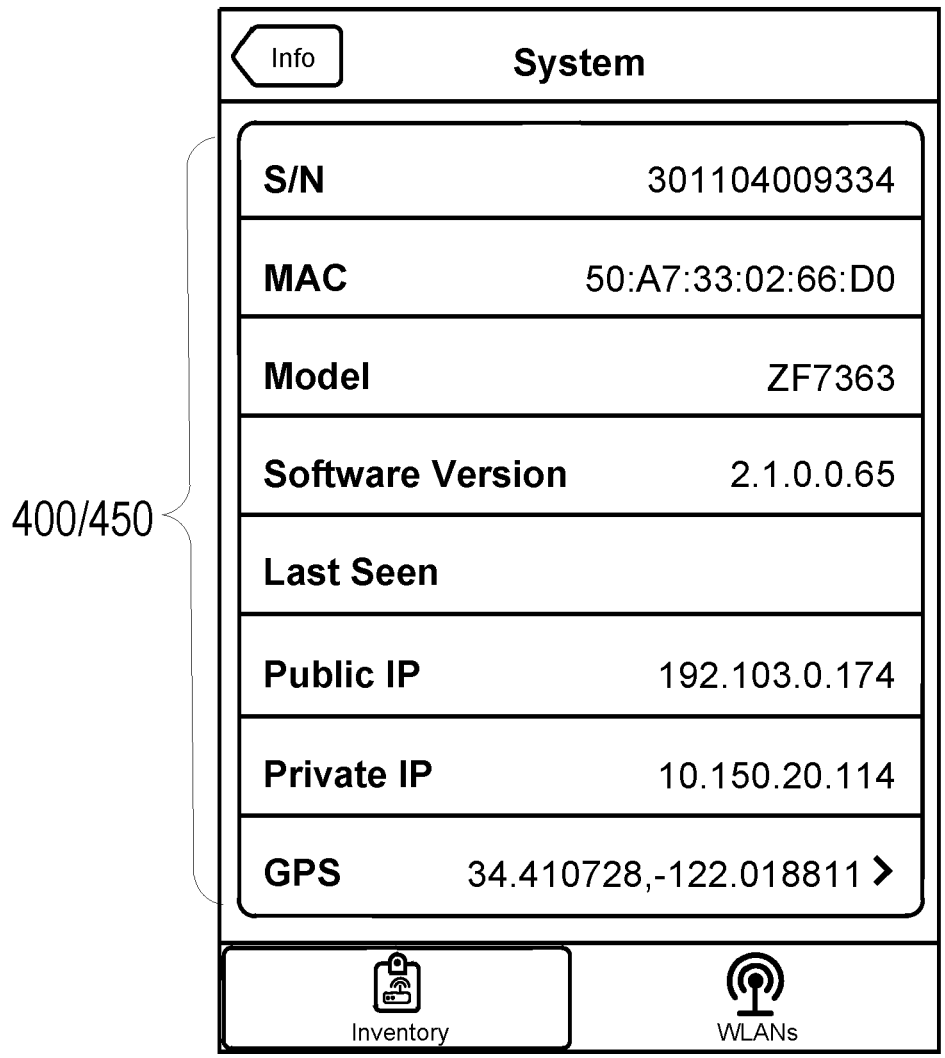
FIG. 4C is a illustrative display of the mobile device describing one example method to implement certain embodiments described here.

In certain embodiments, the mobile device can display detailed information about an AP. For example, the details of a selected AP are displayed (400 in FIG. 4A) 450, as shown in FIG. 4C. In FIG. 4C, detailed AP information is displayed on the mobile device including S/N, MAC address, model, etc. The information which may be displayed could be a combination of data received from the gateway and data generated/stored in the mobile device. Although not shown in this example, a picture of the AP may also be displayed along with the detailed information that is either received from the gateway or taken from a camera of the mobile device. Further, GPS location data of an AP may be included as well.

Edit Configuration Examples

The instructions running on the mobile devices, may be used to instruct the mobile device to not only provision a newly-installed AP, but also to facilitate changes to a previously provisioned and installed AP. As shown in both FIGS. 4A and 4B, from the AP details 400, 450, the mobile device may change settings to the AP including enabling/disabling a Configuration of a Blind SSID (BSSID) 402, the flashing of the AP lights 404, 454 on a per AP basis, creation of a new SSID on the AP (for a Vanity SSID) 408, 452, and collecting a cable modem MAC 458 for MSO examples. AP settings 406, 456, may also be configured including AP Name, DHCP/Static IP, DNS, AAA Server, Mesh Settings, Radio 2.4 & 5 GHz On/Off, ChannelFly, AP Name, and/or AP Tag, etc. AP connectivity tests 410, 460, to backend systems may also be executed where the end-to-end checks include Association with client, AAA Server, DHCP Server, Reach Gateway (Ping/ARP), Resolve DNS, and/or Internet access.

For example, a new vanity SSID may by created by the mobile device user based on a desired SSID of a SP customer. In some implementations, the SP may wish to offer commercial WiFi services to a customer including a custom SSID configuration. The customer may instruct the mobile device user of the desired SSID and confirmation of the vanity SSID may be displayed on the mobile device to the customer.

Further, in the MSO example of FIG. 4B, the system may allow a user to capture and/or view performance data 470.

AP Configuration Example after Reboot

FIG. 5 illustrates an example process in flow chart form, for an embodiment of an AP configuration after reboot. In the example, a user either factory resets the AP 500 to reboot the AP and apply factory configuration 502. If the AP is started using the factory configurations, the AP may start to broadcast a config WLAN that is limited. It may be limited in terms of time, such as a 15 minute time or time until the first mobile device logs off. It may be limited in terms of access, where only one client and only to one AP with no access to uplink port. It may be limited by encryption, such as a key that is only available to the mobile device application.

If the user does not use factory reboot configurations, the user may launch the mobile device app 504 that starts searching for the config WLAN. In the example embodiment, the AP may be shipped with a standard factory configuration that enables a config SSID that can be limited by a hidden SSID, limited access, IP address range, limited time, etc. For example, a hidden SSID is known to the mobile device. The SSID could be composed of some combination of the APs Serial Number or MAC address, for example. Access may also be limited from the config SSID to only send traffic to the AP such that no pass-through traffic upstream is provided. The Default IP address range may also be set to be in the 169.x.x.x range, and may be coordinated with mobile device's IP address, so both devices are in the same subnet and traffic is bridged, as opposed to routed. A time limit may also be used to limit the config SSID to run only for a certain, configurable amount of time.

The mobile device may then connect to the AP via the application on the mobile device and the user may log in 506. Upon successful login, the user may be displayed an AP configuration screen page 508 that provides AP configuration options for user selection and input. The configuration editing option may include AP mesh configuration 512, AP WLAN configuration 514, and AP configuration 516 for example. Through AP config, the mobile device application may transmit first config log to back-end server. This log may include an AP name, user password, DHCP server, radius server etc. Also/alternatively, it may include MAC address, serial number, time stamp, GPS location, etc.

After configuration is completed, back end connectivity tests 510 may be executed, displayed and transmitted to the gateway. A configuration log may also be transmitted to the backend server including transaction marker information. Once configuration is completed, a backup of the AP configuration is stored 518 on the mobile device and transmitted to the gateway. Also, a previously backed up AP configuration 520 may be applied to the AP.

Parallel Connectivity Examples

Figure 6B:
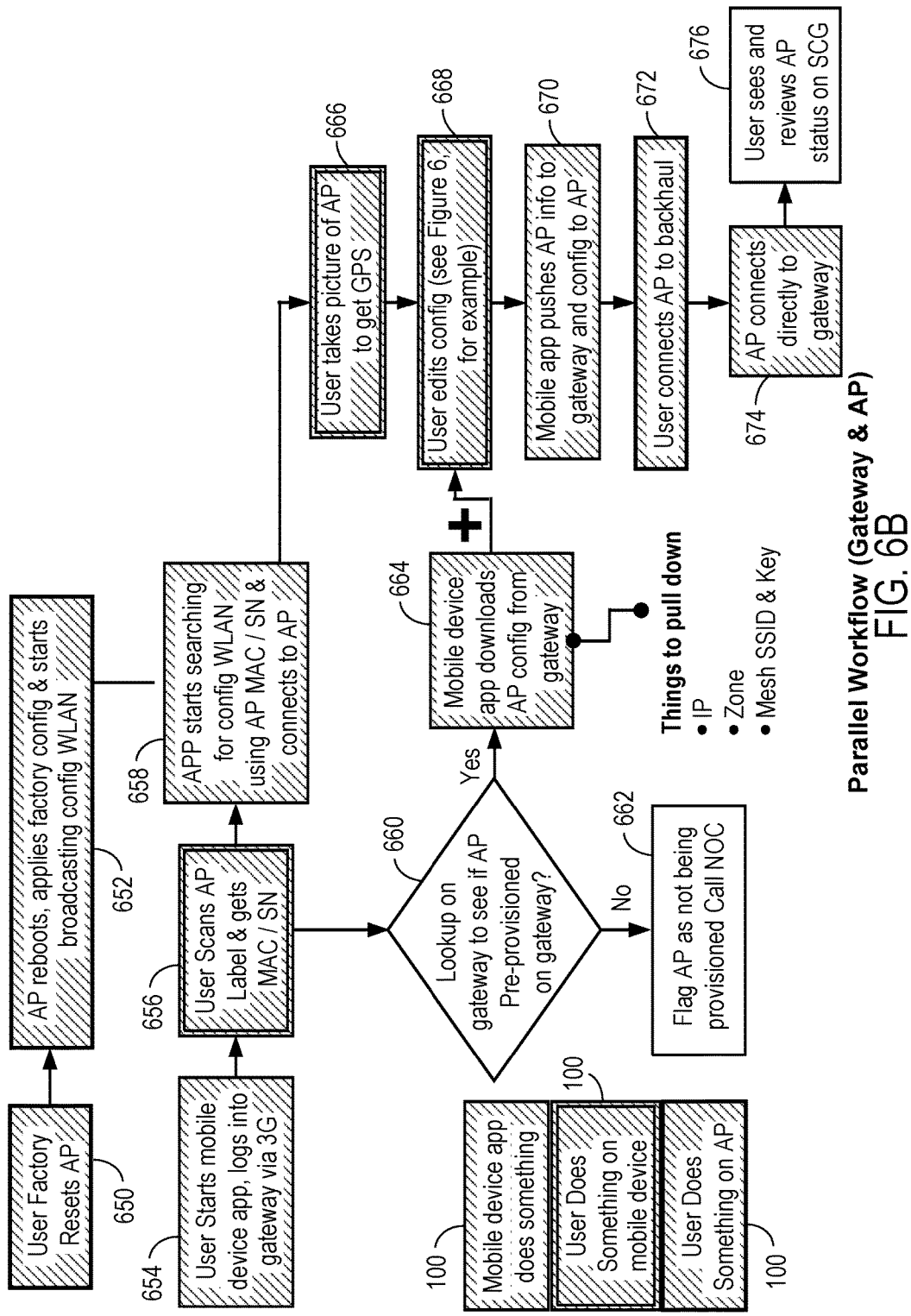
FIG. 6B is another flowcharts describing example methods to implement certain embodiments described here.

FIGS. 6A and 6B show additional examples of different workflows customized based on SP preferences. FIGS. 6A and 6B illustrate a blended model AP configuration & gateway Connectivity and parallel gateway and AP workflow. In FIGS. 6A, 6B, the step of the mobile device application searching for config WLAN 608 using AP MAC address/SN to connect to the AP is preceded by the user factory resetting the AP 600, 650, where the AP applies factory configuration and starts broadcasting a config WLAN 602, 652, a user starting the mobile device app and logging into the gateway via 3G wireless connection 604, 654, and the user scans the AP label to obtain a MAC address/SN 606, 656.

The broadcast config WLAN 602, 652 may include a pre-provisioned SSID, may be unique per AP keyed off of last 6 digits of SN/MAC; may be known IP address on 169.*.*.*subnet on both mobile device and AP so switching to get connectivity; admin login and password; config WLAN may be removed with new AP config.

The mobile device may communicate with the gateway and determine if the AP is pre-provisioned on the gateway 610, 660. If it is not pre-provisioned, the AP may be flagged as not being provisioned and the mobile device may display a message to call the Network Operations Center (NOC) 612, 662 or automatically calls the NOC. Otherwise, the mobile device may download the AP configuration information 614, 664 from the gateway. Once the AP configuration information is downloaded and the mobile device is connected to the AP, the mobile device may push the configuration information to the AP 616, 670. The mobile device may then connect the AP to the backhaul 618, 672 that is the device connected upstream of the AP, such as a cable modem. Next, the AP connects directly to the gateway 620, 674 and the user may review the status, via the mobile device, of the AP obtained from the gateway 622, 676.

FIG. 6B depicts the steps of an example embodiment that adds the additional steps of a user taking a picture of the AP 666 that is tagged with a GPS location after connecting to the AP and a step of a user editing the configuration information 668 prior to the mobile device pushing the AP information to the gateway 670.

FIG. 7 shows an example embodiment where the gateway has pushed a geographic location of an AP to a mobile device to display on a map 700. On the example map, an icon depicts the targeted AP 702. Any example mapping software may be used to display the GPS location of an AP after the location information is given by the gateway. In certain example embodiments, other APs in the area may be shown as well as a selected AP 702.

Customization Examples

In certain example embodiments, customization of the AP provisioning may be useful. To begin customization, for example, a user could login to the mobile device and select an AP to provision or configure. After the mobile device connects to the AP, the mobile device may then provision/configure the AP based on settings either retrieved from the gateway or stored locally on the mobile device. Other features such as performance capture, back-end connectivity checks, transaction markers, and so forth may be made optional, mandatory or restricted based on the end user requirements stored on any of the mobile device and gateway.

However, the features described herein are customizable per SP and per user in their order of execution and feature set. For example, different users may have different sets of functionality to provision, configure, or manage the AP based on one or more criteria such as user rank, SP requirements, controller type, geographic region, device type, location of the AP (i.e. indoor or outdoor), AP groups, AP zones, domains, etc. The SP may have specific requirements that the application may be configured for based on their network. The mobile device application may be configured to be modular and customizable for individual Service Provider (SP) customers. The order of the steps, and availability of screens/selectable options may be customizable and may be downloaded, the first time an individual mobile device connects to the gateway or every time the device connects to the gateway. The mobile device need not necessarily connect to the gateway via cellular connection to provision/configure the AP if the necessary permissions and settings information is stored locally on the device.

For example, a first end user is provided AP inventory screen that follows the login screen, while a second end user is provided the detailed information screen of the last provisioned AP to follow a login page. As another example, a first user is provided a backend connectivity test on an AP configuration screen to be a mandatory field in the flow while that field is optional for a second user. As an example of workflow customization, users of a first SP must run a performance test before and after provisioning an AP, but is optional for users of a second SP. Furthermore, certain options/screens are invisible to users at the first SP but visible to the users of the second SP. For example, the WLAN configuration screen may be set to disabled for technicians at second end user.

The systems and methods is also customizable on a per-user basis, driven through gateway user permissions. For example, a first user is allowed to make configuration changes to an AP, but a second user is not operating under the same gateway and SP. Furthermore, a first user is only allowed to add an AP into Zone 1 but not Zone 2.

CONCLUSION

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The innovations herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

What is claimed is:

1. A method of provisioning an access point (AP), comprising:
   via a gateway with a processor and a memory, in communication with a network and a data storage,
      receiving user login information from a mobile device;
      retrieving user permission information from the data storage based on the user login information;
      sending an authorization to the mobile device based on the permission information;
      sending a prioritized list of at least one AP to receive service to the mobile device,
         wherein the at least one AP to receive service is an AP not in communication with the gateway;
      receiving at least one of,
         a selection of a target AP on the prioritized list of at least one AP to receive service, and
         a label information of the selected target AP;

sending information regarding the target AP for display on the mobile device;
encrypting provisioning information for the target AP; and
using the mobile device as a communication bridge by, sending the encrypted provisioning information to the mobile device, to send to the target AP.

2. The method of claim 1 further comprising,
via the gateway in communication with the network and the data storage,
receiving a picture of a bar code on the target AP;
correlating the received picture of the bar code to a MAC address of the target AP; and
storing the MAC address information of the target AP in data storage.

3. The method of claim 1 further comprising,
via the gateway in communication with the network and the data storage,
comparing the received target AP label information against a list of APs registered in the gateway; and
if the received target AP label information is not found in the list,
sending default information on the target AP to the mobile device for display.

4. The method of claim 3 wherein the default information includes at least one of,
AP name, physical address, default group, mesh configuration, capture performance date and map location.

5. The method of claim 3 further comprising,
via the gateway in communication with the network and the data storage,
receiving edits to the default information from the user via the mobile device; and
saving the edits to the default information on the data storage.

6. The method of claim 1 wherein the provisioning information is related to at least one of,
enabling configuration of a hidden SSID,
enabling editing of AP settings, and
allowing creation of a new SSID.

7. The method of claim 1 wherein the provisioning information is related to at least one of,
flashing AP lights,
allowing testing to be conducted on the target AP backend connectivity, and
sending performance data to the mobile device.

8. The method of claim 1 further comprising,
via the gateway in communication with the network and the data storage, at least one of,
sending a picture of the target AP to the mobile device,
sending a map location of the target AP to the mobile device,
sending an alarm status of the target AP to the mobile device, and
sending AP documents to the mobile device.

9. A system of provisioning an access point (AP), comprising:
a gateway in communication with a network and a data storage, configured to,
receive a user login information from a mobile device;
retrieve a user permission information from the data storage based on the user login information;
send authorization to the mobile device based on the permission information;
send a prioritized list of at least one AP to receive service to the mobile device,
wherein the at least one AP to receive service is an AP not in communication with the gateway;
receive at least one of,
a selection of a target AP on the prioritized list of at least one AP to receive service,
a label information of a target AP;
send information regarding the selected target AP for display on the mobile device;
encrypt provisioning information for the target AP; and
use the mobile device as a communication bridge by, sending the encrypted provisioning information to the mobile device, to send to the target AP.

10. The system of claim 9, wherein the gateway is further configured to,
receive a picture of a bar code on the target AP;
correlate the received picture of a bar code to a MAC address of the target AP; and
cause the MAC address information of the target AP to be stored in data storage.

11. The system of claim 9, wherein the gateway is further configured to,
compare the received target AP label information against a list of APs registered in the gateway; and
if the received target AP label information is not found in the list,
send default information on the target AP to the mobile device for display.

12. The system of claim 11 wherein the default information includes at least one of,
AP name, physical address, default group, mesh configuration, capture performance date and map location.

13. The system of claim 9, wherein the gateway is further configured to,
receive test information from the mobile device; and
cause storage of the received test information in the data storage.

14. The system of claim 9 wherein the label information is a picture of a bar code.

15. The system of claim 9, wherein the gateway is further configured to, at least one of,
enable configuration of BSSID,
enable editing of AP settings, and
allow creation of a new SSID.

16. The system of claim 9, wherein the gateway is further configured to, at least one of,
flash AP lights,
allow testing to be conducted on the target AP backend connectivity, and
send performance data to the mobile device.

17. The system of claim 9, wherein the gateway is further configured to, at least one of,
send a picture of the target AP to the mobile device,
send a map location of the target AP to the mobile device,
send an alarm status of the target AP to the mobile device, and
send AP documents to the mobile device.

18. A non-transitory computer-readable medium encoded with a computer program, on a mobile device with internal memory, for a method of provisioning an access point (AP), the method comprising:
receiving provisioning information from a gateway regarding a target AP;
loading the received provisioning information into the mobile device internal memory;
connecting to the target AP,
wherein the target AP is not in communication with the gateway;

wherein the target AP is using a security setting;
causing display of default information regarding the target AP;
allowing the user of the mobile device to edit the default information regarding the target AP;
sending the edited information regarding the target AP to the gateway;
receiving encrypted provisioning information for the target AP from the gateway; and
sending the encrypted provisioning information to the target AP.

19. The non-transitory computer-readable medium of claim 18 wherein the security setting is at least one of,
a hidden SSID,
a predetermined AP broadcasting time,
an AP broadcasting time to wait until the provisioning mobile device is logged off the first time,
a limited access by accepting traffic only to the AP with no access to an uplink port, and
an encryption key that is only available with the provisioning application on the mobile device.

20. The non-transitory computer-readable medium of claim 18 wherein the user input to the default information regarding the target AP is, at least one of,
an AP group,
a mesh configuration, and
a location on a map.

* * * * *